(12) United States Patent
Yamazaki et al.

(10) Patent No.: US 11,326,530 B2
(45) Date of Patent: May 10, 2022

(54) TEMPERATURE ACQUISITION APPARATUS FOR INTERNAL COMBUSTION ENGINE

(71) Applicant: Honda Motor Co., Ltd., Tokyo (JP)

(72) Inventors: Daiki Yamazaki, Wako (JP); Hidekazu Hironobu, Wako (JP); Masatoshi Nakajima, Wako (JP); Ryuichi Hata, Wako (JP); Nobuaki Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/215,169

(22) Filed: Mar. 29, 2021

(65) Prior Publication Data

US 2021/0301741 A1    Sep. 30, 2021

(30) Foreign Application Priority Data

Mar. 31, 2020 (JP) .............................. JP2020-065389

(51) Int. Cl.
| | |
|---|---|
| *F02P 5/15* | (2006.01) |
| *F02D 35/02* | (2006.01) |
| *F02D 41/00* | (2006.01) |
| *F02D 41/30* | (2006.01) |
| *F02P 5/14* | (2006.01) |

(52) U.S. Cl.
CPC ......... *F02D 35/025* (2013.01); *F02D 35/026* (2013.01); *F02D 41/0002* (2013.01); *F02D 41/3011* (2013.01); *F02P 5/14* (2013.01); *F02P 5/1506* (2013.01); *F02D 2200/021* (2013.01); *F02D 2200/022* (2013.01); *F02D 2200/023* (2013.01); *F02D 2200/04* (2013.01)

(58) Field of Classification Search
CPC .. F02D 35/025; F02D 35/026; F02D 41/3011; F02D 2200/021; F02D 2200/022; F02D 2200/04; F02P 5/1506
USPC .................... 73/114.32, 114.33, 114, 34, 35
See application file for complete search history.

(56) References Cited

U.S. PATENT DOCUMENTS

| | | | |
|---|---|---|---|
| 2007/0023006 A1* | 2/2007 | Takeda | .................... F02D 37/02 |
| | | | 123/305 |
| 2017/0009621 A1* | 1/2017 | Ogata | .................... F02D 35/026 |
| 2019/0040836 A1* | 2/2019 | Toyama | .............. F02D 13/0234 |

(Continued)

FOREIGN PATENT DOCUMENTS

| | | |
|---|---|---|
| JP | H1182111 A | 3/1999 |
| JP | 2005133579 A | 5/2005 |
| JP | 2008280914 A | 11/2008 |

(Continued)

OTHER PUBLICATIONS

Japanese office action; Application 2020-065389; dated Nov. 30, 2021.

*Primary Examiner* — Erick R Solis
(74) *Attorney, Agent, or Firm* — Duft & Bornsen, PC

(57) ABSTRACT

A temperature acquisition apparatus for an internal combustion engine is configured to acquire a temperature of a combustion chamber of the internal combustion engine. The apparatus includes: an electronic control unit having a processor and a memory coupled to the processor. The processor is configured to perform: acquiring an intake air amount of the internal combustion engine; calculating a cumulative intake air amount based on the intake air amount; and acquiring a temperature of the internal combustion engine based on the cumulative intake air amount.

14 Claims, 16 Drawing Sheets

(56) References Cited

U.S. PATENT DOCUMENTS

2019/0277208 A1* 9/2019 Matoba ............... F02D 41/0007
2021/0095610 A1* 4/2021 Hashimoto ......... F02D 41/2477

FOREIGN PATENT DOCUMENTS

| JP | 2018100599 A | 6/2018 |
| JP | 2019035331 A | 3/2019 |
| WO | 2011064896 A1 | 6/2011 |

* cited by examiner

TEMPERATURE ACQUISITION APPARATUS FOR INTERNAL COMBUSTION ENGINE

CROSS-REFERENCE TO RELATED APPLICATION

This application is based upon and claims the benefit of priority from Japanese Patent Application No. 2020-065389 filed on Mar. 31, 2020, the content of which is incorporated herein by reference.

BACKGROUND OF THE INVENTION

Field of the Invention

This invention relates to a temperature acquisition apparatus for internal combustion engine which acquires a temperature of a combustion chamber of an internal combustion engine.

Description of the Related Art

As this type of apparatuses, there have been known apparatuses that acquire the in-cylinder temperature, which is the temperature in the cylinder of an engine, on the basis of the sensor value of an exhaust temperature sensor (for example, see Japanese Unexamined Patent Application Publication No. 2019-035331 (JP2019-035331A)). The apparatus of JP2019-035331A acquires the in-cylinder temperature by detecting the temperature of exhaust gas emitted from an engine and flowing through an exhaust passage using an exhaust temperature sensor disposed on the exhaust passage and multiplying the detected temperature by a correction coefficient or the like corresponding to a sensor time constant.

However, the apparatus of JP2019-035331A estimates the temperature in the cylinder on the basis of the temperature of exhaust gas and does not consider the surface temperature of a cylinder, piston, or the like forming a combustion chamber. For this reason, it is difficult to use this apparatus to perform control using the piston crown surface temperature or the like as a parameter.

SUMMARY OF THE INVENTION

An aspect of the present invention is a temperature acquisition apparatus for an internal combustion engine. The apparatus is configured to acquire a temperature of a combustion chamber of the internal combustion engine. The apparatus includes: an electronic control unit having a processor and a memory coupled to the processor. The processor is configured to perform: acquiring an intake air amount of the internal combustion engine; calculating a cumulative intake air amount based on the intake air amount; and acquiring a temperature of the internal combustion engine based on the cumulative intake air amount.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 25. A temperature acquisition apparatus for internal combustion engine according to the embodiment of the present invention is applied to a direct-injection gasoline engine as an internal combustion engine. This engine is mounted on a vehicle, specifically, an engine vehicle that travel using only an engine as a drive source and hybrid vehicles that travel using an engine and a motor as drive sources. Hereafter, an example will be described in which the engine including the temperature acquisition apparatus is mounted on a hybrid vehicle.

Figure 1:
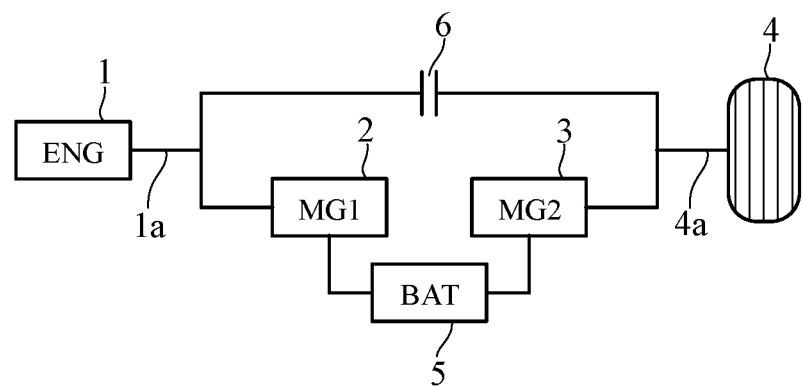
FIG. 1 is a diagram schematically showing configuration of a travel drive unit of a hybrid vehicle on which an internal combustion engine, to which a temperature acquisition apparatus for internal combustion engine according to an embodiment of the present invention is applied, is mounted.

FIG. 1 is a diagram schematically showing the configuration of the travel drive unit of the hybrid vehicle on which the engine including the temperature acquisition apparatus according to the embodiment of the present invention is mounted. As shown in FIG. 1, a first motor-generator (MG1) 2 is connected to the output shaft 1a of an engine (ENG) 1, and a second motor-generator (MG2) 3 is connected to the rotation shaft 4a of a drive wheel 4. The first motor-generator 2 mainly serves as a generator that generates power when driven by the engine 1, and the power generated by the first motor-generator 2 is accumulated in a battery (BAT) 5 through an inverter (not shown). The second motor-generator 3 mainly serves as a travel motor that is driven by power supplied from the battery 5 through an inverter (not shown).

A clutch 6 is interposed between the output shaft 1a of the engine 1 and the rotation shaft 4a of the drive wheel 4, and the output shaft 1a and rotation shaft 4a are connected or disconnected through the clutch 6. When the output shaft 1a and rotation shaft 4a are disconnected, the vehicle travels by only the power of the second motor-generator 3 (EV travel). When the output shaft 1a and rotation shaft 4a are connected through the clutch 6, the vehicle travels by only the power of the engine 1 (engine travel) or travels by the power of the engine 1 and second motor-generator 3 (hybrid travel). In other words, the vehicle is able to switch the travel mode among an EV mode, in which EV travel is performed, an engine mode, in which engine travel is performed, and a hybrid mode, in which hybrid travel is performed.

Figure 2:
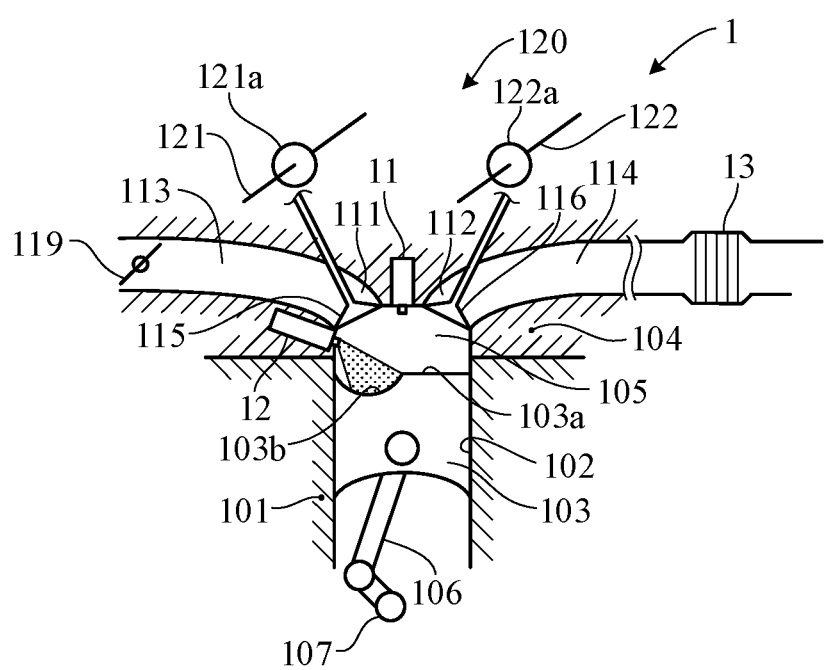
FIG. 2 is a diagram schematically showing configuration of main components of the engine in FIG. 1.

FIG. 2 is a diagram schematically showing the configuration of main components of the engine 1. The engine 1 is a spark-ignition internal combustion engine having a fuel cut function of stopping supply of fuel to multiple cylinders during deceleration or the like of the vehicle and is a four-stroke engine, which goes through four strokes consisting of intake, compression, expansion and exhaust in one operation cycle. For convenience, the operation from the start of the intake stroke to the end of the exhaust stroke is referred to as "one cycle of the combustion stroke of the engine," or simply as "one cycle." Although the engine 1 includes multiple cylinders, such as four, six, or eight ones, the configuration of one cylinder is shown in FIG. 2. The cylinders have the same configuration.

As shown in FIG. 2, the engine 1 includes a cylinder 102 formed in a cylinder block 101, a piston 103 disposed slidably in the cylinder 102, and a combustion chamber 105 formed between the crown surface 103a of the piston 103 (piston crown surface) and a cylinder head 104. For example, a recess 103b is formed in the piston crown surface 103a so as to be along a tumble flow in the cylinder. The piston 103 is connected to a crankshaft 107 through a connecting rod 106 and rotates the crankshaft 107 (corresponding to the output shaft 1a of FIG. 1) by reciprocating of the piston 103 along the inner wall of the cylinder 102.

The cylinder head 104 is provided with an intake port 111 and an exhaust port 112. An intake passage 113 communicates with the combustion chamber 105 through the intake port 111, while an exhaust passage 114 communicates with the combustion chamber 105 through the exhaust port 112. The intake port 111 is opened and closed by an intake valve 115, and the exhaust port 112 is opened and closed by an exhaust valve 116. A throttle valve 119 is disposed on the upstream side of the intake passage 113 connected to the intake valve 115. The throttle valve 119 consists of, for example, a butterfly valve, and the intake air amount G supplied to the combustion chamber 105 is controlled by the throttle valve 119. The intake valve 115 and exhaust valve 116 are open and close driven by a valve train 120.

An ignition plug 11 and a direct-injection injector 12 are mounted on the cylinder head 104 so as to face the combustion chamber 105. The ignition plug 11 is disposed between the intake port 111 and exhaust port 112 and ignites a fuel-air mixture in the combustion chamber 105 by producing a spark by electrical energy.

The injector 12 is disposed near the intake valve 115 and injects fuel when driven by electrical energy. More specifically, the high-pressure fuel is supplied from a fuel tank to the injector 12 through a fuel pump, and the injector 12 converts the fuel into high fine particles and injects the resulting fuel into the combustion chamber 105 obliquely downward at a predetermined timing. The injector 12 may be disposed otherwise and may be disposed, for example, near the ignition plug 11.

The valve train 120 includes an intake cam shaft 121 and an exhaust cam shaft 122. The intake cam shaft 121 integrally includes intake cams 121a corresponding to the cylinders (cylinders 102), and the exhaust cam shaft 122 integrally includes exhaust cams 122a corresponding to the cylinders. The intake cam shaft 121 and exhaust cam shaft 122 are connected to the crankshaft 107 through timing belts (not shown) and rotate once each time the crankshaft 107 rotates twice.

The intake valve 115 is opened and closed by rotation of the intake cam shaft 121 through an intake rocker arm (not shown) at a predetermined timing corresponding to the profile of the intake cam 121a. The exhaust valve 116 is opened and closed by rotation of the exhaust cam shaft 122 through an exhaust rocker arm (not shown) at a predetermined timing corresponding to the profile of the exhaust cam 122a.

A catalyst device 13 for purifying exhaust gas is disposed on the exhaust passage 114. The catalyst device 13 is a device including a three-way catalyst having a function of removing and purifying HC, CO, and NOx contained in exhaust gas by oxidation and reduction. Other types of catalyst, such as an oxidation catalyst that oxidizes CO and HC in exhaust gas, may be used. When the temperature of the catalyst included in the catalyst device 13 is increased, the catalyst is activated, resulting in an increase in the exhaust gas purification effect of the catalyst device 13.

To improve fuel efficiency, the engine 1 has a fuel cut function of stopping fuel injection from the injector 12 when predetermined fuel cut conditions are satisfied during engine travel. That is, when the fuel cut conditions are satisfied, the mode is switched (referred to as the "F/C mode") and thus fuel injection is stopped. For example, the fuel cut conditions are as follows: the manipulated variable of the accelerator pedal (accelerator opening) is equal to or smaller than a predetermined value; the rotational speed of the crankshaft 107 (engine speed) is equal to or larger than a predetermined value; and the vehicle speed is equal to or larger than a predetermined value. These fuel cut conditions are satisfied, for example, during deceleration travel. In the F/C mode, intake of air into the combustion chamber 105 is continued.

Also, to improve fuel efficiency, the engine 1 has an idling stop function of stopping fuel injection from the injector 12 when predetermined idling stop conditions are satisfied. Specifically, when the idling stop conditions are satisfied, the mode is switched to an idling stop mode (referred to as the "I/S mode") and thus fuel injection is stopped. For example, the idling stop conditions are as follows: the vehicle speed is equal to or lower than a predetermined vehicle speed during a stop or the like of the vehicle; the accelerator pedal is not in operation; and the operation of a brake pedal is detected. In the I/S mode, the engine 1 is stopping, and intake of air into the combustion chamber 105 is stopped, as during EV travel.

Although not shown, the engine 1 includes an exhaust gas recirculator that recirculates a part of exhaust gas to an intake system, a blow-by gas return device that returns blow-by gas to the intake system and burns it again, a purge controller that controls supply of evaporative fuel gas in a fuel tank to the intake system, and the like. The exhaust gas recirculator includes an internal EGR that recirculates exhaust gas in the combustion chamber 105 under the control of the valve train 120 and an external EGR that guides a part of exhaust gas from the exhaust passage 114 to the intake system through an EGR passage and an EGR valve. The purge controller includes a purge passage through which evaporative fuel gas in the fuel tank is guided to the intake system and a purge valve that is disposed on the purge passage and controls the flow of gas passing through the purge passage. The engine 1 may include a supercharger.

Figure 3:
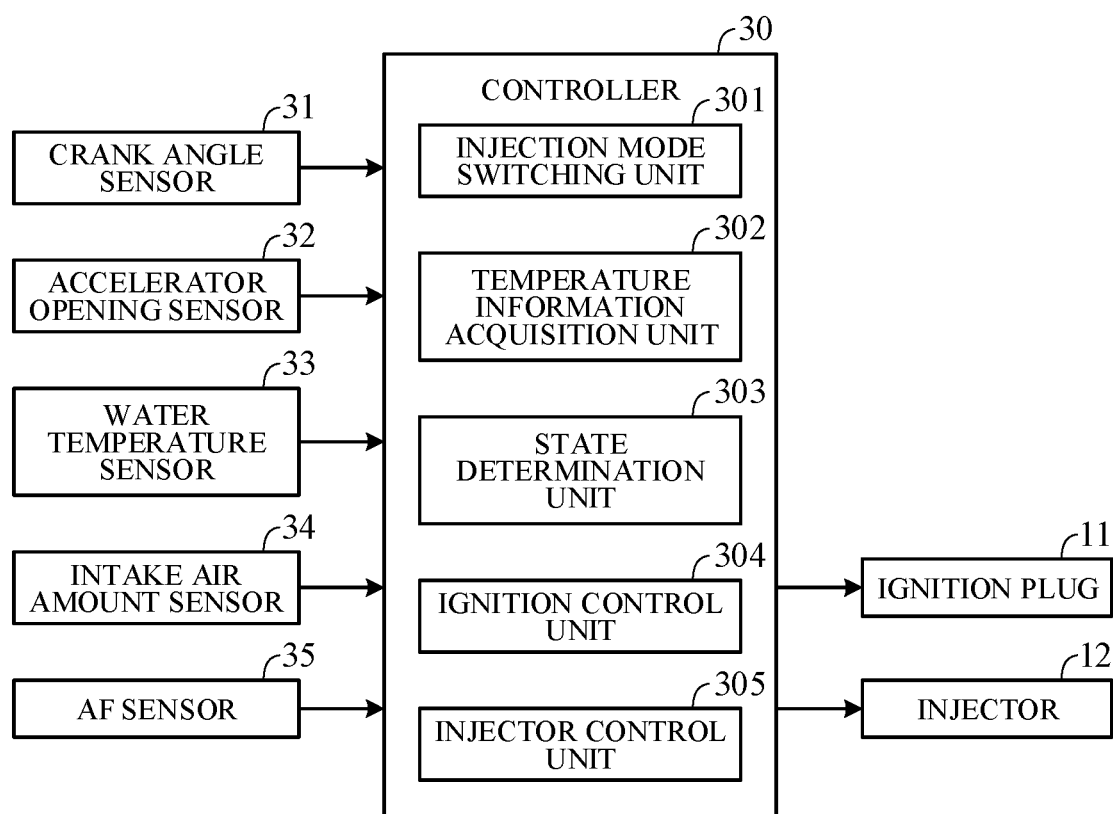
FIG. 3 is a block diagram showing configuration of main components of an internal combustion engine control apparatus to which the temperature acquisition apparatus for internal combustion engine according to the embodiment of the present invention is applied.

The engine 1 configured as above is controlled by an internal combustion engine control apparatus. FIG. 3 is a block diagram showing the configuration of main components of the internal combustion engine control apparatus. As shown in FIG. 3, the internal combustion engine control apparatus is formed centered on a controller 30 for controlling the engine and includes various types of sensors, actuators, and the like connected to the controller 30. Specifically, a crank angle sensor 31, an accelerator opening sensor 32, a water temperature sensor 33, an intake air amount sensor 34, an AF sensor 35, the ignition plug 11, and the injector 12 are connected to the controller 30.

The crank angle sensor 31 is disposed on the crankshaft 107 and configured to output pulse signals in association with rotation of the crankshaft 107. The controller 30 identifies the rotation angle of the crankshaft 107 (crank angle) with respect to the position of the top dead center (TDC) of the piston 103 at the start of the intake stroke and calculates the engine RPM (engine speed) on the basis of pulse signals from the crank angle sensor 31.

The accelerator opening sensor 32 is disposed on the acceleration pedal (not shown) of the vehicle and detects the manipulated variable of the acceleration pedal (accelerator opening). A command indicating the target torque of the engine 1 is issued on the basis of the value detected by the accelerator opening sensor 32. The water temperature sensor 33 is disposed on a passage through which engine cooling water for cooling the engine 1 flows and detects the temperature of the engine cooling water (cooling water temperature). The intake air amount sensor 34 is a sensor that detects the amount of intake air (intake air amount G) and consists of, for example, an air flow meter disposed on the intake passage 113 (more specifically, on the upstream side of the throttle valve). The AF sensor 35 is disposed on the exhaust passage 114 and on the upstream side of the catalyst device 13 and detects the air-fuel ratio of exhaust gas in the exhaust passage 114.

The controller 30 consists of an electronic control unit (ECU) and includes a computer including an arithmetic processing unit, such as a CPU, a storage unit, such as a ROM or RAM, and other peripheral circuits. The controller 30 includes, as functional elements, an injection mode switching unit 301, a temperature information acquisition unit 302, a state determination unit 303, an ignition control unit 304, and an injector control unit 305.

Figure 4:
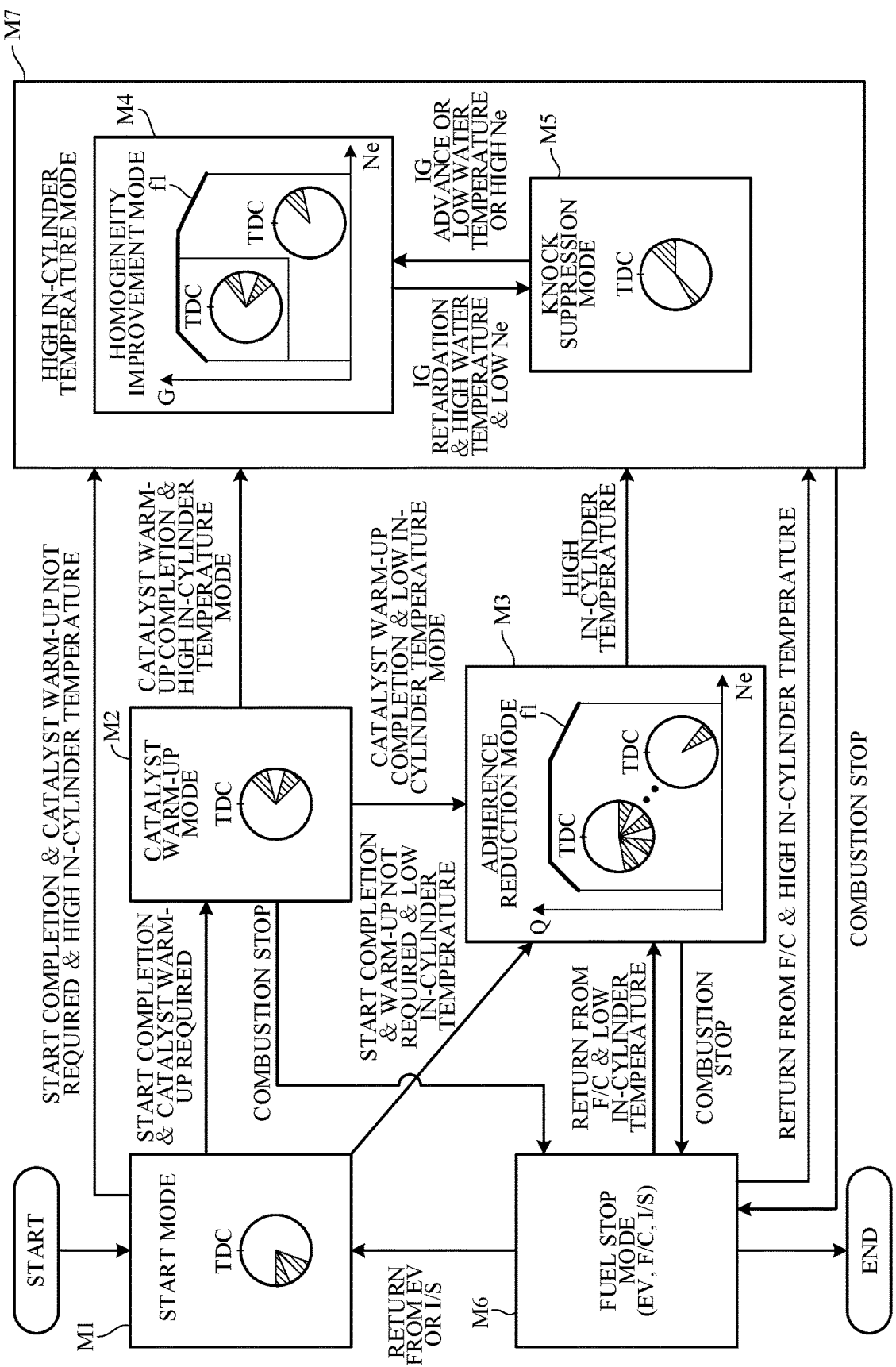
FIG. 4 is a diagram showing an example of switching of injection modes by an injection mode switching unit in FIG. 3.

The injection mode switching unit 301 switches the injection mode in accordance with the operation state of the engine 1 (engine operation state). FIG. 4 is a diagram showing an example of switching of the injection mode in the period from when the operation of the engine 1 is started in response to turn-on of an ignition switch until the operation of the engine 1 is ended in response to turn-off of the ignition switch. As shown in FIG. 4, the injection mode includes a start mode M1, a catalyst warm-up mode M2, an adherence reduction mode M3, a homogeneity improvement mode M4, a knock suppression mode M5, and a fuel stop mode M6. The homogeneity improvement mode M4 and knock suppression mode M5 represent high in-cylinder temperature states, in which the piston temperature (in-cylinder temperature) is high, and are collectively referred to as the "high in-cylinder temperature mode M7."

In the modes M1 to M5 other than the fuel stop mode in FIG. 4, the crank angle in a range from the start of the intake stroke (the intake top dead center (TDC)) to the end of the compression stroke (the compression top dead center (TDC)) is represented by the angle of a clockwise circle using the intake top dead center (TDC) as the start point, and the fuel injection timing is represented by a hatched sector extending radially from the center of the circle. In the intake stroke, the crank angle is in a range equal to or larger than 0° and equal to or smaller than 180°; in the compression stroke, the crank angle is in a range equal to or larger than 180° and equal to or smaller than 360. Hereafter, a crank angle range from 0° to 90° may be referred to as the first half of the intake stroke, a crank angle range from 90° to 180° as the second half of the intake stroke, a crank angle range from 180° to 270° as the first half of the compression stroke, and a crank angle range from 270° to 360° as the second half of the compression stroke.

The start mode M1 is a mode for starting the engine 1 and is performed immediately after the ignition switch is turned on, or when the mode is restored from the EV mode or I/S mode. In the start mode M1, the engine 1 is cranked and then a mixture is produced by injecting the fuel twice in the first half of the compression stroke, that is, by two-injection compression, as shown in FIG. 4. In this case, the same amount of fuel is injected each time. By injecting the fuel in the compression stroke, the startability of the engine 1 is improved. Also, by injecting the fuel multiple times (in multiple stages) in the first half of the compression stroke, the amount of each fuel injection is suppressed. This allows for suppressing adherence of the fuel to the piston crown surface 103a or the wall surface of the cylinder 102 and thus suppressing soot formation.

As long as both an improvement in the startability and suppression of soot are achieved, the start mode M1 is not limited to two-injection compression and may be a different injection mode, such as one in which the fuel is injected once in the compression stroke (one-injection compression) or one in which the fuel is injected multiple times in the intake stroke and compression stroke (multiple-injection intake-compression). When the start mode M1 is complete, the injection mode is switched to one of the catalyst warm-up mode M2, adherence reduction mode M3, and high in-cylinder temperature mode M7 (e.g., homogeneity improvement mode M4).

The catalyst warm-up mode M2 is a mode for promoting warm-up of the catalyst device 13 to activate the catalyst earlier. In the catalyst warm-up mode M2, a mixture is produced by injecting the fuel twice in the intake stroke, that is, by two-injection intake, as shown in FIG. 4. In this case, the same amount of fuel is injected each time. Also, in the catalyst warm-up mode M2, the timing at which the mixture is ignited by the ignition plug 11 is retarded from the MBT (minimum advance for the best torque), at which the best torque is obtained. The retardation of the ignition timing causes the mixture to be burnt later and thus increases the amount of air supplied to the combustion chamber 105 for generating the target torque and the amount of fuel injection. This increases the amount of heat generated by combustion of the mixture and thus warms up the catalyst device 13 earlier. In the catalyst warm-up mode M2, the fuel is injected at a predetermined timing that is previously stored in the memory and that is not changed in accordance with the engine RPM (engine speed) or the intake air amount G.

By injecting the fuel by two-injection intake in the catalyst warm-up mode M2, the mixture is homogenized, resulting in an increase in the combustion efficiency and suppression of emission deterioration. As long as emission deterioration is suppressed, the catalyst warm-up mode M2 is not limited to two-injection intake and may be a different injection mode, such as one in which the fuel is injected once in the intake stroke (one-injection intake) or one in which the fuel is injected multiple times in the intake stroke and compression stroke (multiple-injection intake-compression). When the catalyst warm-up mode M2 is complete, the injection mode is switched to the adherence reduction mode M3 or high in-cylinder temperature mode M7 (e.g., homogeneity improvement mode M4).

The adherence reduction mode M3 is performed in order to reduce soot when the piston temperature is low. In the adherence reduction mode M3, the fuel is injected in an area other than a predetermined injection-prohibited area near the intake top dead center (TDC) at the start of the intake stroke and a predetermined injection-prohibited area near the compression top dead center (TDC) at the end of the compression stroke, that is, in an area in which the piston crown surface 103a is away from the injector 12 (injectable areas). For example, the injection-prohibited area is set in a part or almost all of the first half of the intake stroke and a part or almost all of the second half of the compression stroke.

More specifically, the injection-prohibited area is set in accordance with the engine speed. As the engine speed becomes higher, the piston crown surface 103a retreats from the injector 12 in the intake stroke at a higher speed and approaches the injector 12 in the compression stroke at a higher speed. For this reason, as the engine speed becomes higher, the injection-prohibited area in the intake stroke becomes narrower (the end of the injection-prohibited area is shifted to the advance side), and the injection-prohibited area in the compression stroke becomes wider (the start of the injection-prohibited area is shifted to the retard side).

Figure 5:
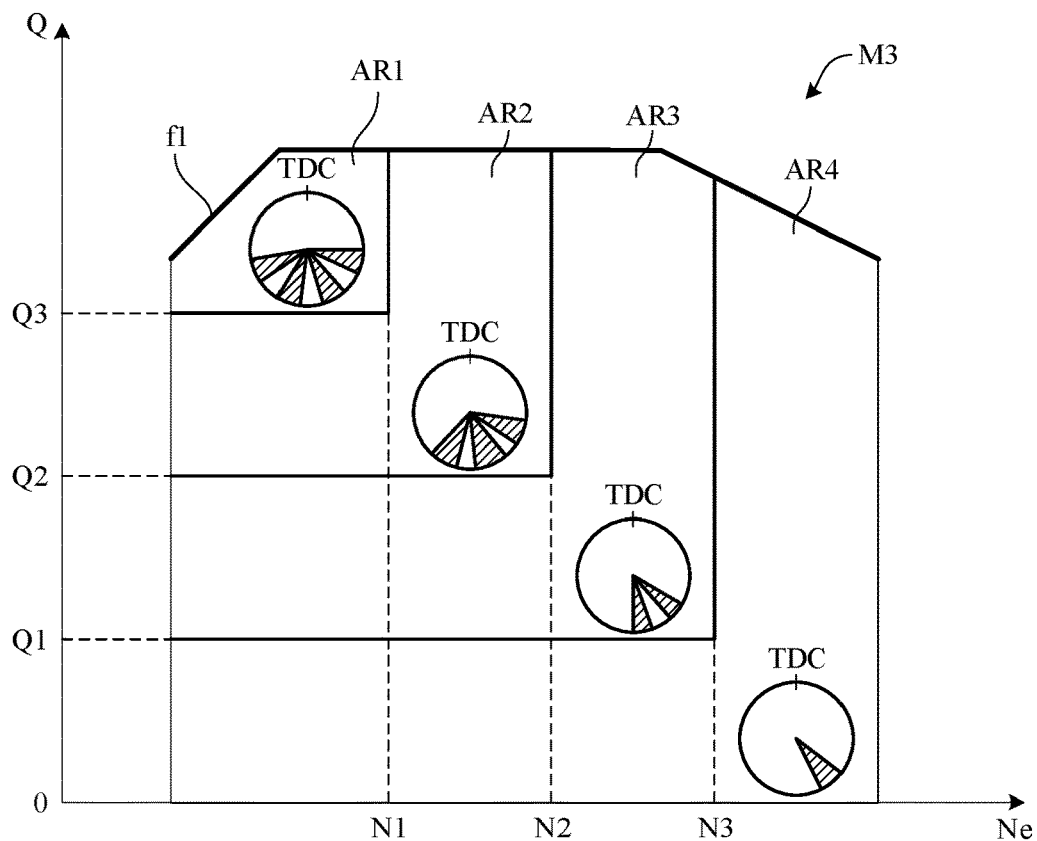
FIG. 5 is a diagram showing an example of an injection map corresponding to an adherence reduction mode in FIG. 4.

The fuel injection frequency and fuel injection timing in the injectable area are determined on the basis of a map previously stored in the memory, for example, a map shown in FIG. 5. Specifically, as shown in FIG. 5, the injection frequency and injection timing are determined on the basis of a predetermined map so as to be associated with a characteristic f1 of the maximum output torque corresponding to the engine speed Ne and the target amount of injection Q, as shown in FIG. 5, and the injection frequency is set to one to four times. If the injection frequency is multiple times, the same amount of fuel is injected each time. The target amount of injection Q is calculated as a value such that the actual air-fuel ratio becomes the target air-fuel ratio and is determined in accordance with the intake air amount G. For this reason, the map of FIG. 5 may be rewritten as a map of the engine speed Ne and the intake air amount G, like the map of the homogeneity improvement mode M4 of FIG. 4.

To suppress adherence of the fuel to the piston crown surface 103a, it is preferred to reduce the amount of one injection by increasing the injection frequency. However, the minimum amount of one injection Qmin of the injector 12 is defined by the specification of the injector 12, and the injector 12 cannot inject the fuel in a smaller amount than the minimum amount of injection Qmin (MinQ constraint). Accordingly, the injection frequency is once in an area in which the target amount of injection is small, and is gradually increased to twice, three times, and four times as the target amount of injection Q is increased.

On the other hand, to increase the injection frequency, the injector 12 has to be driven at a higher speed. For this reason, for example, a capacitor in an injector driving electrical circuit of the controller 30 has to be repeatedly charged and discharged within a short time. In this case, the injector 12 has to be driven at a higher speed as the engine speed Ne becomes higher. Thus, the controller 30 bears a higher electrical load and generates a larger amount of heat. The injection frequency is limited due to this heat constraint of the controller 30 (ECU heat constraint). That is, while the injection frequency is four times in an area in which the engine speed Ne is low, the injection frequency is gradually limited to three times, twice, and once as the engine speed Ne is increased.

In view of the foregoing, for example, the injection frequency is set to four times (four-stage injection) in an area AR1 in which the engine speed Ne is lower than a predetermined value N1 and the target amount of injection Q is equal to or larger than a predetermined value Q3; the injection frequency is set to three times (three-stage injection) in an area AR2 in which the engine speed Ne is lower than a predetermined value N2 and the target amount of injection Q is equal to or larger than a predetermined value Q2, except for the area AR1; the injection frequency is set to twice (two-stage injection) in an area AR3 in which the engine speed Ne is lower than a predetermined value N3 and the target amount of injection Q is equal to or larger than a predetermined value Q1, except for the areas AR1 and AR2; and the injection frequency is set to once (single injection) in an area AR4 in which the engine speed Ne is equal to or higher than the predetermined value N3 or the target amount of injection Q is smaller than the predetermined value Q1.

The predetermined values N1 to N3 have a relationship of N1<N2<N3, and the predetermined values Q1 to Q3 have a relationship of Q1<Q2<Q3. The predetermined values N1 to N3 and Q1 to Q3 are previously determined through an experiment and stored in the memory. The maximum injection frequency in the adherence reduction mode M3 is determined on the basis of the specification of the injector 12, controller 30, or the like, the mounting position of the injector 12, or the like and may be smaller or larger than four times. When the adherence reduction mode is complete, the injection mode is switched to the high in-cylinder temperature mode M7 (e.g., homogeneity improvement mode M4) or fuel stop mode M6.

The homogeneity improvement mode M4 is an injection mode in which fuel efficiency is optimized. In the homogeneity improvement mode, the fuel is injected by one-injection intake or two-injection intake in accordance with a control map corresponding to the engine speed Ne and the intake air amount G previously stored in the memory. Specifically, as shown in FIG. 4, the fuel is injected by two-injection intake in a high-load, low-rotation area in which the engine speed Ne is low and the intake air amount G is large, while the fuel is injected by one-injection intake in an area in which the engine speed Ne is high or the intake air amount G is small. This control map is changed in accordance with the cooling water temperature. In the case of two-injection intake, the same amount of fuel is injected each time. By injecting the fuel by one-injection intake or two-injection intake in the homogeneity improvement mode, the mixture in the combustion chamber 105 is homogenized by a tumble flow and thus fuel efficiency is increased.

Also, in the homogeneity improvement mode M4, the ignition timing of the ignition plug 11 is controlled mainly in accordance with the engine speed Ne and the intake air amount G. Specifically, in an area in which knocks do not occur or are less likely to occur, the ignition timing is controlled to the optimum ignition timing, i.e., MBT that is closer to the advance side than the compression top dead center (TDC) and that is previously stored in the memory. On the other hand, in an area in which knocks occur or are more likely to occur, for example, in a high-load, low-rotation area in which the engine speed is low and the intake air amount G is large, the ignition timing is retarded from the MBT in accordance with a characteristic previously stored in the memory in order to suppress knocks. The ignition timing may be retarded by disposing a knock sensor that detects knocks and detecting knocks using the knock sensor. When predetermined knock suppression conditions are satisfied, the homogeneity improvement mode M4 is switched to the knock suppression mode M5.

The knock suppression mode M5 is an injection mode in which knocks are suppressed. In the knock suppression mode M5, the retarded ignition timing is returned (advanced) to the MBT side, and the fuel is injected once in the intake stroke (e.g., in the first half of the intake stroke) and once in the compression stroke (e.g., in the first half of the compression stroke) (multiple-injection intake-compression). In the compression stroke, the amount of injection is the minimum amount of injection Qmin; in the intake stroke, the amount of injection is an amount obtained by subtracting the minimum amount of injection Qmin from the target amount of injection Q. By injecting the fuel in the compression stroke, the temperature of end gas in the combustion chamber 105 is reduced by the latent heat of vaporization.

Thus, knocks are suppressed while the amount of retardation of the ignition timing is suppressed. As a result, fuel efficiency is increased compared to when the ignition timing is retarded and the fuel is injected only in the intake stroke. When the knock suppression node is complete, that is, when the knock suppression conditions become unsatisfied, the injection mode is switched to the homogeneity improvement mode. That is, when the in-cylinder temperature is high (the injection mode is the high in-cylinder temperature mode M7), the injection mode is switched between the homogeneity improvement mode M4 and knock suppression mode M5 in accordance with whether the knock suppression conditions are satisfied.

The fuel stop mode M6 is a mode in which fuel injection is stopped and thus combustion is stopped in the combustion chamber 105. When the travel mode is the EV mode, F/C mode, or I/S mode, the injection mode is switched to the fuel stop mode M6. For example, when combustion is stopped in the adherence reduction mode M3 or high in-cylinder temperature mode M7, the injection mode is switched to the fuel stop mode M6. When the fuel stop mode M6 is complete, the injection mode is switched to one of the start mode M1, adherence reduction mode M3, and high in-cylinder temperature mode M7.

The temperature information acquisition unit 302 of FIG. 3 acquires information on the temperature in the cylinder 102. This temperature information is information on the in-cylinder temperature, which influences adherence of the fuel in the cylinder 102, and corresponds to the temperature of the piston crown surface 103a. For this reason, if a sensor capable of accurately detecting the temperature of the piston crown surface 103a is disposed, the temperature information acquisition unit 302 would only have to acquire information from that sensor. However, the piston crown surface 103a reciprocates in the cylinder 102 so as to face the combustion chamber 105 having a high temperature and therefore it is difficult to directly accurately detect the temperature of the piston crown surface 103a using such a sensor.

On the other hand, the temperature of the piston crown surface 103a has a correlation with the intake air amount G supplied into the combustion chamber 105 for combustion in the combustion chamber 105. Specifically, when the cumulative intake air amount ΣG (cumulative intake air amount ΣG) is increased, a larger amount of heat is generated in the combustion chamber 105 and thus the temperature of the piston crown surface 103a corresponding to the in-cylinder temperature is increased. For this reason, the temperature information acquisition unit 302 acquires signals from the intake air amount sensor 34 and calculates the cumulative intake air amount ΣG on the basis of the acquired signals.

Figure 6:
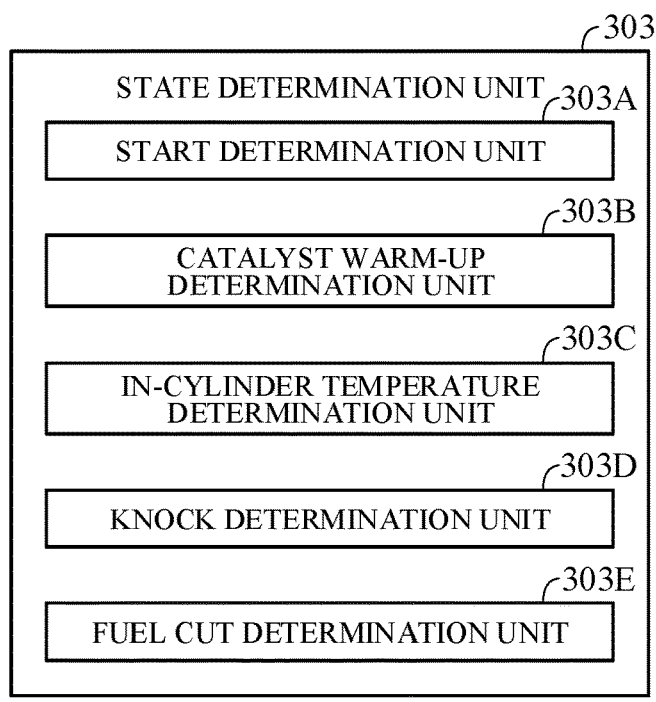
FIG. 6 is a block diagram showing functional configuration of a state determination unit in FIG. 3.

The state determination unit 303 determines the engine operation state related to switching of the injection mode. FIG. 6 is a block diagram showing the functional elements of the state determination unit 303. As shown in FIG. 6, the state determination unit 303 includes a start determination unit 303A, a catalyst warm-up determination unit 303B, an in-cylinder temperature determination unit 303C, a knock determination unit 303D, and a fuel cut determination unit 303E.

In the start mode M1 of FIG. 4, the start determination unit 303A determines whether the start of the engine 1 is complete. Specifically, the start determination unit 303A determines whether the start of the engine 1 is complete, on the basis of whether a predetermined count value has been counted after the rotational speed of the cranked engine calculated on the basis of signals from the crank angle sensor 31 is increased to the complete explosion rotational speed, at which the engine is able to maintain rotation on its own. If the start determination unit 303A determines that the start of the engine 1 is complete, the injection mode switching unit 301 switches the injection mode from the start mode M1 to the catalyst warm-up mode M2, adherence reduction mode M3, or high in-cylinder temperature mode M7 (e.g., homogeneity improvement mode M4).

The start determination unit 303A determines not only whether the start of the engine 1 is complete, but also whether the engine 1 needs to be started. Specifically, in the fuel stop mode M6 of FIG. 4, the start determination unit 303A determines whether the travel mode needs to be switched from the EV mode to the engine mode or hybrid mode and whether the travel mode needs to be restored from the I/S mode. If the start determination unit 303A determines that the travel mode needs to be switched to the engine mode or that the travel mode needs to be restored from the I/S mode, the injection mode switching unit 301 switches the injection mode from the fuel stop mode M6 to the start mode M1.

In the catalyst warm-up mode M2 of FIG. 4, the catalyst warm-up determination unit 303B determines whether warm-up of the catalyst device 13 (catalyst warm-up) is complete. This determination is a determination as to whether the total workload of the engine 1 has reached the target total workload required for catalyst warm-up. The target total workload is set in accordance with the cooling water temperature detected by the water temperature sensor 33 at the start of the engine 1 using a previously stored relational expression, characteristic, or map. For example, when the cooling water temperature is low, it takes time to warm up the catalyst, since the engine 1 has yet to be warmed up. In view of the foregoing, the target total workload is set to a larger value as the cooling water temperature is lower.

The catalyst warm-up determination unit 303B first calculates the total workload of the engine 1 corresponding to the cooling water temperature on the basis of signals from the water temperature sensor 33. Subsequently, when the total workload reaches the target total workload, the catalyst warm-up determination unit 303B determines that the catalyst warm-up is complete. Thus, the injection mode switching unit 301 switches the injection mode from the catalyst warm-up mode M2 to the adherence reduction mode M3 or high in-cylinder temperature mode M7 (e.g., homogeneity improvement mode M4).

Also, in the start mode M1 of FIG. 4, the catalyst warm-up determination unit 303B determines whether catalyst warm-up is needed. For example, when the cooling water temperature is high due to restoration from the EV travel, or the like, the catalyst warm-up determination unit 303B sets the target total workload to 0 and determines that catalyst warm-up is not needed. In this case, the injection mode switching unit 301 switches the injection mode from the start mode M1 to the adherence reduction mode M3 or high in-cylinder temperature mode M7 (e.g., homogeneity improvement mode M4). On the other hand, if, in the start mode M1, the catalyst warm-up determination unit 303B sets the target total workload to a value larger than 0 and determines that catalyst warm-up is needed, the injection mode switching unit 301 switches the injection mode from the start mode M1 to the catalyst warm-up mode M2.

The in-cylinder temperature determination unit 303C determines whether the in-cylinder temperature corresponding to the temperature of the piston crown surface 103a is equal to or higher than a predetermined value (e.g., 100° C.), on the basis of the cumulative intake air amount ΣG acquired by the temperature information acquisition unit 302. That is, the in-cylinder temperature determination unit 303C determines whether the in-cylinder temperature is a high in-cylinder temperature equal to or higher than the predetermined value or a low in-cylinder temperature lower than the predetermined value. In each of the start mode M1, catalyst warm-up mode M2, and fuel stop mode M6 of FIG. 4, the in-cylinder temperature determination unit 303C determines whether the in-cylinder temperature is a high in-cylinder temperature.

In the homogeneity improvement mode M4 of FIG. 4, the knock determination unit 303D determines whether the knock suppression conditions are satisfied. This determination is a determination as to whether the amount of retardation of the ignition timing for suppressing knocks has become equal to or larger than a predetermined value and is a determination as to whether the injection mode needs to be switched to the mode in which knocks are suppressed. When the engine rotational speed (engine speed) is high and when the cooling water temperature is low, knocks are less likely to occur. From this viewpoint, the knock suppression conditions are as follows: the amount of retardation of the ignition timing from the MBT is equal to or larger than a predetermined value; the cooling water temperature is equal to or higher than a predetermined value; and the engine speed is equal to or lower than a predetermined value. If the knock determination unit 303D determines that the knock suppression conditions are satisfied, the injection mode switching unit 301 switches the injection mode from the homogeneity improvement mode M4 to the knock suppression mode M5.

If, in the knock suppression mode M5, the knock determination unit 303D determines that the knock suppression conditions are unsatisfied, the injection mode switching unit 301 switches the injection mode from the knock suppression mode M5 to the homogeneity improvement mode M4. The injection mode may be switched from the adherence reduction mode M3 to the knock suppression mode M5 without going through the homogeneity improvement mode M4. Specifically, if, in the adherence reduction mode M3, the in-cylinder temperature determination unit 303C determines that the in-cylinder temperature is high, the injection mode may be switched to the knock suppression mode M5. Thus, when the in-cylinder temperature determination unit 303C determines that a low in-cylinder temperature state has been changed to a high in-cylinder temperature state, the injection mode is quickly switched to the knock suppression mode M5 without going through the homogeneity improvement mode M4, resulting in an increase in the combustion efficiency.

The fuel cut determination unit 303E determines whether fuel cut is needed in each of the catalyst warm-up mode M2, adherence reduction mode M3, and high in-cylinder temperature mode M7 of FIG. 4. In other words, the fuel cut determination unit 303E determines whether the travel mode needs to be switched to the EV mode, F/C mode, or I/S mode. If the fuel cut determination unit 303E determines that fuel cut is needed, the injection mode switching unit 301 switches the injection mode from the catalyst warm-up mode M2, adherence reduction mode M3, or high in-cylinder temperature mode M7 to the fuel stop mode M6.

The ignition control unit 304 of FIG. 3 outputs control signals to the ignition plug 11 so that the ignition timing becomes the target ignition timing according to a map or characteristic corresponding to the operation state previously stored in the memory. For example, in the catalyst warm-up mode M2, the ignition control unit 304 outputs control signals to the ignition plug 11 so that the ignition timing is retarded from the MBT. In the homogeneity improvement mode M4, the ignition control unit 304 outputs control signals to the ignition plug 11 so that the ignition timing becomes the MBT or is retarded to suppress knocks. In the knock suppression mode M5, the ignition control unit 304 outputs control signals to the ignition plug 11 so that the retarded ignition timing is returned (advanced) to the MBT side.

The injector control unit 305 calculates the target amount of injection per cycle in accordance with the intake air amount G detected by the intake air amount sensor 34 while performing feedback control so that the actual air-fuel ratio detected by the AF sensor 35 becomes the target air-fuel ratio (e.g., a theoretical air-fuel ratio). The injector control unit 305 then calculates the target amount of one injection (the unit target amount of injection) corresponding to the injection mode of FIG. 4 and outputs control signals to the injector 12 so that the injector 12 injects the fuel in the unit target amount at a predetermined timing.

Given the above configuration, the configuration of the temperature acquisition apparatus for internal combustion engine according to the embodiment of the present invention will be described. The temperature acquisition apparatus for internal combustion engine according to the present embodiment is a more concrete form of the configuration of the in-cylinder temperature determination unit 303C of FIG. 6.

Figure 7:
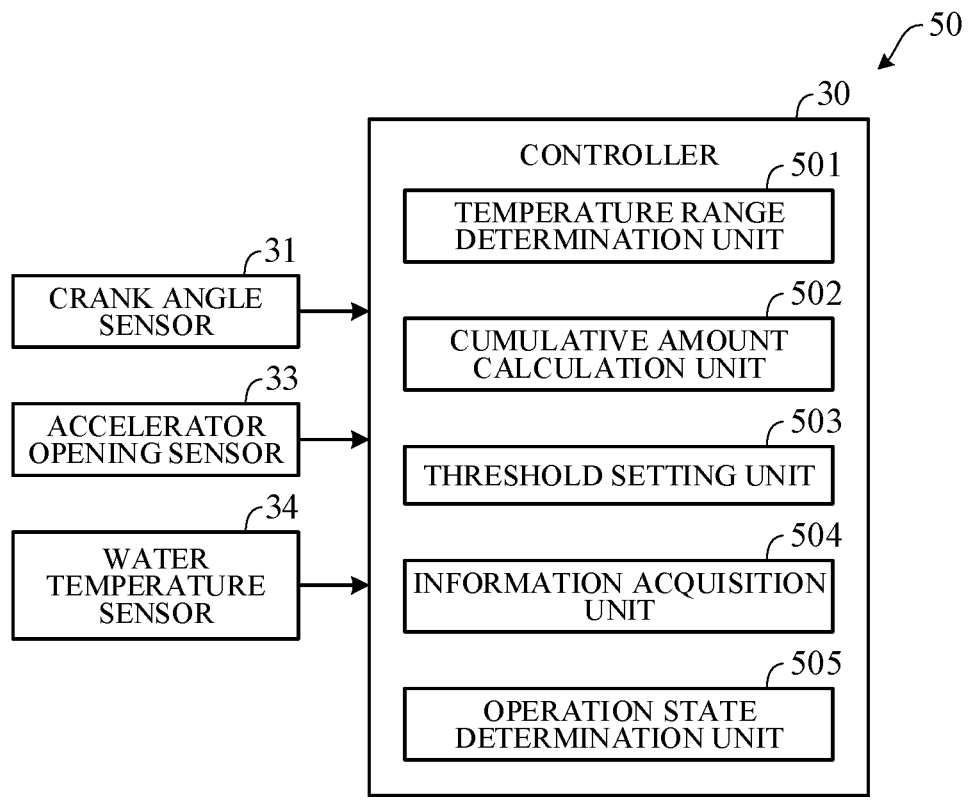
FIG. 7 is a block diagram showing configuration of main components of the temperature acquisition apparatus for internal combustion engine according to the embodiment of the present invention.

FIG. 7 is a block diagram showing the configuration of main components of the temperature acquisition apparatus 50 for internal combustion engine (referred to as the "apparatus 50") according to the embodiment of the present invention. As shown in FIG. 7, the apparatus 50 includes the crank angle sensor 31, water temperature sensor 33, and intake air amount sensor 34 connected to the controller 30. The controller 30 includes, as functional elements, a temperature range determination unit 501, a cumulative amount calculation unit 502, a threshold setting unit 503, an information acquisition unit 504, and an operation state determination unit 505.

The information acquisition unit 504 acquires information on the ignition timing IG of the engine 1. For example, the information acquisition unit 504 acquires information on the target ignition timing from the injection controller 304 of FIG. 3. The operation state determination unit 505 determines the engine operation state. Specifically, the operation state determination unit 505 determines whether the engine 1 is in a normal mode, in which the engine performs air intake and fuel injection, the F/C mode, in which the engine performs only air intake, a cold start mode, in which the engine starts from a cold state, or an operation stop mode (EV mode or I/S mode), in which the engine stops air intake and fuel injection.

The temperature range determination unit 501 determines whether the temperature Tp of the piston crown surface 103a (FIG. 2) is a high in-cylinder temperature equal to or higher than a predetermined temperature Tp0 (e.g., 100° C.), on the basis of the workload of the engine 1 (in-cylinder warm-up determination). In the case of a gasoline engine, the output (power) of the engine 1 has a correlation with the intake air amount G, and the workload (total workload) of the engine 1 has a correlation with the cumulative intake air amount $\Sigma G$. Since the cylinder 102 and piston 103 forming the combustion chamber 105 have heat capacities corresponding to the respective materials and masses, raising the temperature of these components requires a predetermined amount of heat, that is, a predetermined workload corresponding to the respective heat capacities.

Figure 8:
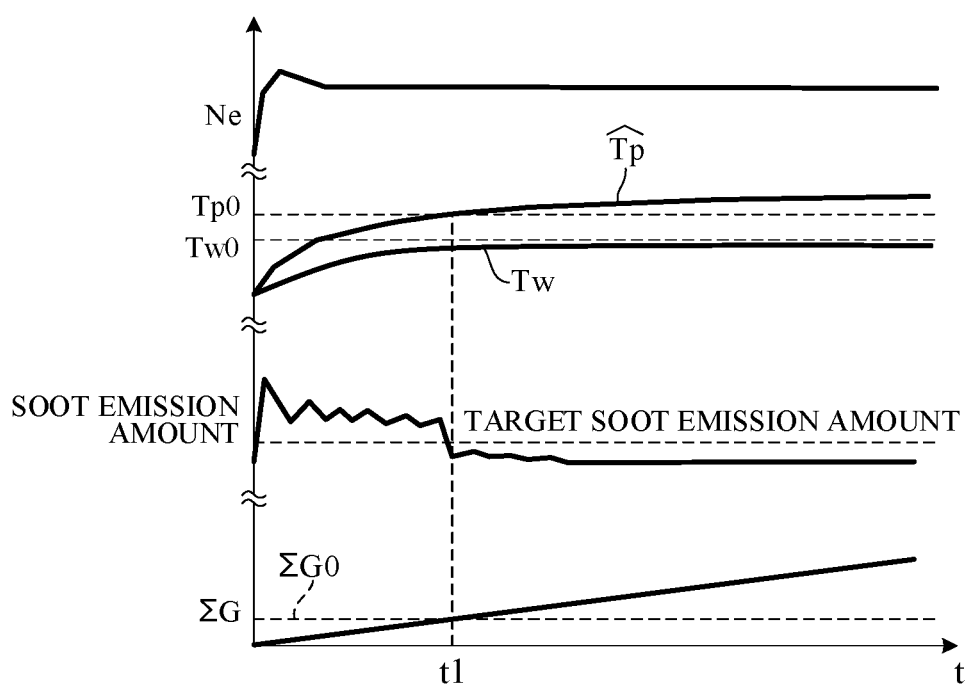
FIG. 8 is a diagram for explaining rise in temperature of a piston crown surface in FIG. 2.

FIG. 8 is a diagram showing increases in the temperature of the piston crown surface 103a and shows an example of temporal changes in soot emission measured using a measurement instrument when warming up the engine 1 in a cold state. In FIG. 8, the temperature Tp of the piston crown surface 103a is an estimated value, and the cooling water temperature TW is a value detected by the water temperature sensor 33. The cumulative intake air amount $\Sigma G$ is a value calculated by the cumulative amount calculation unit 502 on the basis of the intake air amount G detected by the intake air amount sensor 34.

As shown in FIG. 8, in the cold state of the engine 1, the temperature of the entire engine 1 including the piston crown surface 103a and engine cooling water is uniform. The cold state of the engine 1 can be represented by the engine cooling water temperature TW detected by the water temperature sensor 33 at the start of the engine 1. During warm-up of the engine 1, the cumulative intake air amount $\Sigma G$ (the amount of heat or workload generated by combustion) is increased and thus the temperature Tp of the piston crown surface 103a is increased. The increases in the temperature Tp of the piston crown surface 103a cause gradual warm-up of the entire engine 1 including the piston crown surface 103a from the combustion chamber 105 side and thus increases the engine cooling water temperature TW. The warmed-up engine 1 is cooled by the engine cooling water that maintains its temperature TW at a predetermined temperature TWO (e.g., 90° C.) or less by passing through a radiator (not shown).

As shown in FIG. 8, the amount of soot emission is approximately constant until time t21 and is sharply reduced at time t21 and falls below the target amount of emission. This will be described below. As shown in FIG. 2, the fuel injected from the injector 12 adheres to the piston crown surface 103a (recess 103b). If the temperature Tp of the piston crown surface 103a has already reached the predetermined temperature Tp0 (e.g., 100° C.), the adhering fuel immediately evaporates and therefore soot is less likely to occur. On the other hand, if the temperature Tp of the piston crown surface 103a has not reached the predetermined temperature Tp0, the adhering fuel is burnt incompletely and therefore soot is more likely to occur.

By conducting a soot emission amount check test as shown in FIG. 8, the cumulative intake air amount (threshold value) $\Sigma G0$ of the amounts of intake air G required for the temperature Tp of the piston crown surface 103a to rise from the engine cooling water temperature TW at the start of the engine 1 to the predetermined temperature Tp0 is grasped in advance. The temperature range determination unit 501 determines whether the cumulative intake air amount $\Sigma G$ is equal to or larger than the threshold value $\Sigma G0$. If the temperature range determination unit 501 determines that the cumulative intake air amount $\Sigma G$ is equal to or larger than the threshold value $\Sigma G0$, it is determined that the in-cylinder temperature is a high in-cylinder temperature. Thus, it is determined whether the temperature Tp of the piston crown surface 103a has reached the predetermined temperature Tp0, without having to directly detect the temperature Tp of the piston crown surface 103a using a sensor.

Figure 9:
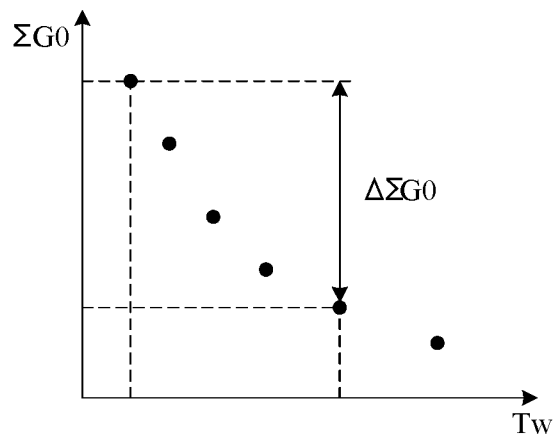
FIG. 9 is a diagram showing an example of test result in FIG. 8, when changing engine cold state.

The threshold value $\Sigma G0$ as shown in FIG. 8 varies with the cold state of the engine 1, that is, the cooling water temperature TW at the start of the engine 1. FIG. 9 is an example of a test result when the same confirmation test as in FIG. 8 is performed by changing the cold state of the engine 1, showing the characteristics of the threshold value $\Sigma G0$ with respect to the cooling water temperature Tw at the start of the engine 1.

As shown in FIG. 9, the threshold value $\Sigma G0$ of the cumulative intake air amount $\Sigma G$ required for the in-cylinder temperature to reach a high in-cylinder temperature becomes larger as the cooling water temperature TW at the start of the engine 1 is lower; the threshold value $\Sigma G0$ becomes smaller as the cooling water temperature TW is higher. The characteristics of the threshold value $\Sigma G0$ with respect to the cooling water temperature TW at the start of the engine 1 as shown in FIG. 9 are previously stored in the memory. The threshold setting unit 503 sets the threshold value ΣG0 in accordance with the characteristics previously stored in the memory.

Figure 10:
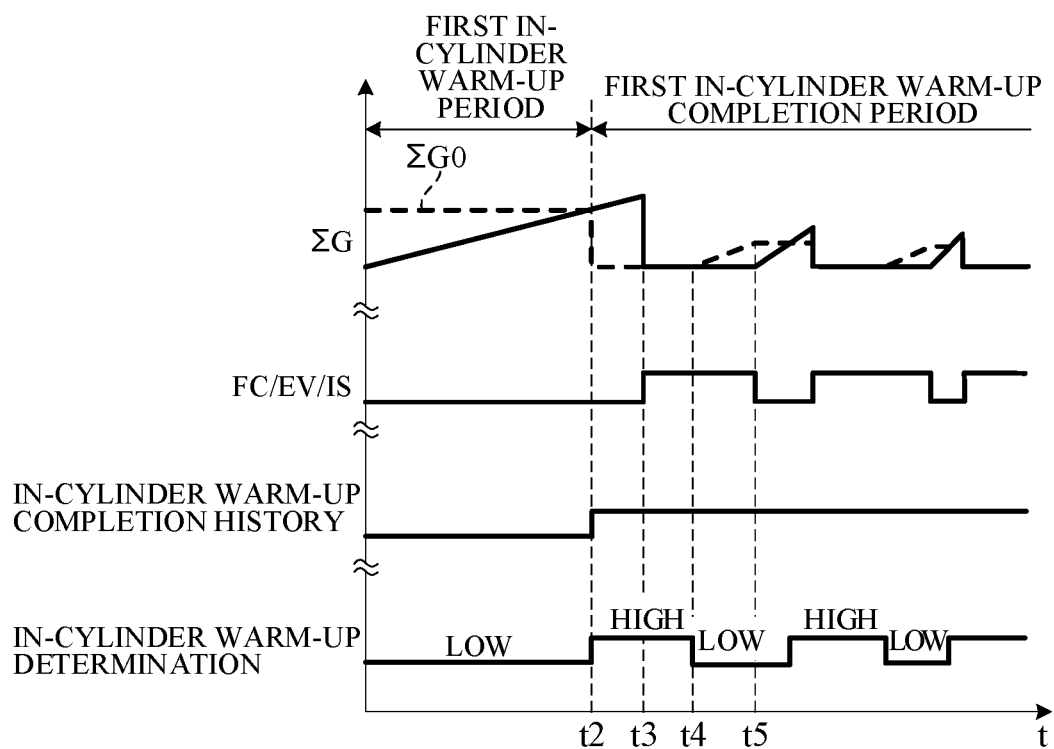
FIG. 10 is a diagram for explaining overall determination by a temperature range determination unit in FIG. 7.

FIG. 10 is a graph schematically showing a determination made by the temperature range determination unit 501. As shown in FIG. 10, when the engine 1 is started from a cold state, the threshold setting unit 503 sets a threshold value ΣG0 corresponding to the cooling water temperature Tw at the time of starting the engine 1. The set threshold value ΣG0 is a threshold value that allows for reliably warming up the inside of the cylinder in accordance with the cold state of the engine 1.

At time t2, the cumulative intake air amount ΣG calculated by the cumulative amount calculation unit 502 reaches the threshold value ΣG0, and the temperature range determination unit 501 determines that the engine 1 has made a transition from a low in-cylinder temperature state to a high in-cylinder temperature state and that in-cylinder warm-up is complete and sets an in-cylinder warm-up completion history flag to "1." Thus, the threshold setting unit 503 clears or resets, to "0," the threshold value ΣG0 set in accordance with the cooling water temperature Tw at the time of starting the engine 1.

A period from when the engine 1 is started from the cold state until, at time t2, the temperature range determination unit 501 determines for the first time that the engine 1 is in a high in-cylinder temperature state (a period in which the in-cylinder warm-up completion history flag is "0") may be referred to as the "first in-cylinder warm-up period." Also, a period after, at time t2, the temperature range determination unit 501 determines for the first time that the engine 1 is in a high in-cylinder temperature state (a period in which the in-cylinder warm-up completion history flag is "1") may be referred to as the "first in-cylinder warm-up completion period."

At time t3, the operation state determination unit 505 determines that the engine operation state has been changed from the normal mode to the F/C mode or operation stop mode, and the cumulative intake air amount ΣG calculated by the cumulative amount calculation unit 502 is cleared or reset to "0." That is, in the F/C mode or operation stop mode, the engine 1 does not work, and the intake air amount G does not contribute to increasing the temperature of the piston crown surface 103a and therefore the cumulative intake air amount ΣG is cleared.

From time t3 to time t4, the F/C mode or operation stop mode is continued, and the temperature range determination unit 501 determines that the engine 1 has returned from the high in-cylinder temperature state to a low in-cylinder temperature state. In the F/C mode, the intake air blows through the cylinder and thus cools the inside of the cylinder. For this reason, when the cumulative intake air amount ΣG calculated by the cumulative amount calculation unit 502 in the F/C mode reaches a predetermined value ΣGc, the temperature range determination unit 501 withdraws the in-cylinder warm-up completion determination. In the operation stop mode, heat is not generated, and the in-cylinder temperature is reduced with time. When an elapsed time period Δt since the change to the operation stop mode reaches a predetermined time period Δtc, the temperature range determination unit 501 withdraws the in-cylinder warm-up completion determination.

From time t4 to time t5, the F/C mode or operation stop mode is continued. At time t5, the engine 1 returns to the normal mode, and the threshold setting unit 503 resets the threshold value ΣG0 considering cooling of the inside of the cylinder in the warm-up state. Specifically, the threshold setting unit 503 resets the threshold value ΣG0 on the cumulative intake air amount ΣG calculated by the cumulative amount calculation unit 502 during the F/C mode. Or, the threshold setting unit 503 resets the threshold value ΣG0 corresponding to the elapsed time period Δt since the change to the operation stop mode.

Figure 11:
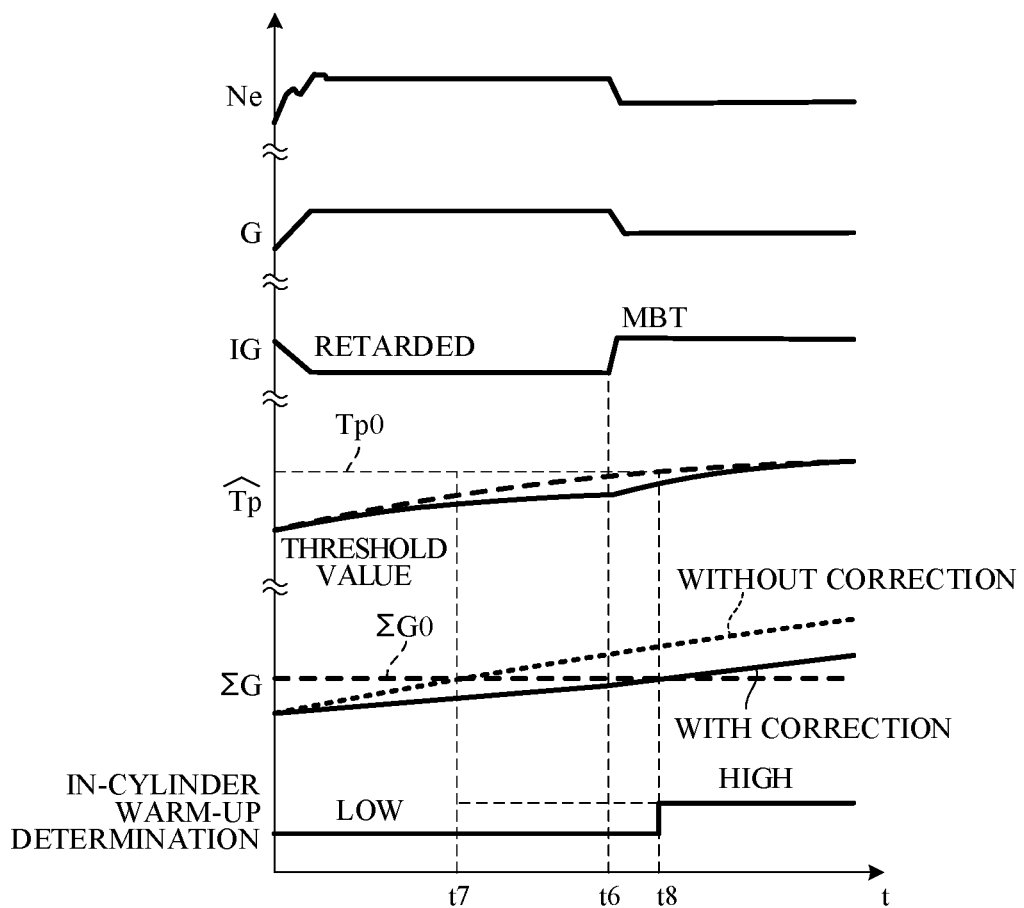
FIG. 11 is a diagram for explaining correction of a cumulative amount by a cumulative amount calculation unit in FIG. 7.

FIG. 11 is a graph showing the correction of the cumulative intake air amount ΣG by the cumulative amount calculation unit 502. In FIG. 11, the temperature Tp of the piston crown surface 103a when the engine 1 is warmed up at the optimum ignition timing MBT is shown by a broken line, and the temperature Tp when the ignition timing IG is retarded and then the engine 1 is warmed up is shown by a solid line.

If the ignition timing IG is retarded from the optimum ignition timing MBT so that the mixture is combusted later, combustion gas is exhausted immediately after the combustion and thus a part of heat generated by the combustion contributes to increasing the temperature of the catalyst device 13 rather than warming up the inside of the cylinder (catalyst warming mode M2 in FIG. 4). Thus, as shown in FIG. 11, in a period until time t6, during which the ignition timing IG is retarded, the temperature Tp of the piston crown surface 103a is moderately increased compared to when the engine 1 is warmed up at the optimum ignition timing MBT.

On the other hand, characteristics of the threshold value ΣG0 as shown in FIG. 9 are previously determined by conducting a confirmation test of FIG. 8 at the optimum ignition timing MBT. For this reason, when the cumulative intake air amount ΣG reaches the threshold value ΣG0 at time t7 as shown in FIG. 11, the temperature range determination unit 501 determines that in-cylinder warm-up is complete, although the temperature Tp of the piston crown surface 103a has yet to reach a predetermined temperature Tp0.

Figure 12:
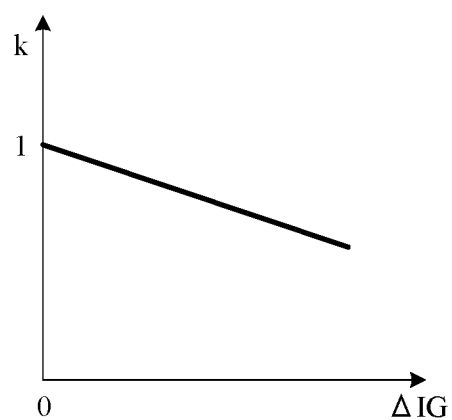
FIG. 12 is a diagram for explaining a correction coefficient for the cumulative amount by the cumulative amount calculation unit in FIG. 7.

The cumulative amount calculation unit 502 considers the workload that does not contribute in-cylinder warm-up and corrects the cumulative intake air amount ΣG so that after the temperature Tp of the piston crown surface 103a reaches the predetermined temperature Tp0, the temperature range determination unit 501 determines that in-cylinder warm-up is complete. Specifically, the cumulative amount calculation unit 502 corrects the cumulative intake air amount ΣG by multiplying the intake air amount G by a correction coefficient k corresponding to the amount of retardation ΔIG of the ignition timing IG from the optimum ignition timing MBT, as shown in FIG. 12.

As shown in FIG. 11, the cumulative intake air amount ΣG corrected considering the amount of retardation ΔIG is moderately increased compared to the uncorrected cumulative intake air amount ΣG and reaches the threshold value ΣG0 at time t8, at which the temperature Tp of the piston crown surface 103a reaches the predetermined temperature Tp0. Thus, the temperature range determination unit 501 is able to determine that in-cylinder warm-up is complete, at a proper timing considering the in-cylinder temperature increase rate moderated by retarding the ignition timing IG.

Figure 13:
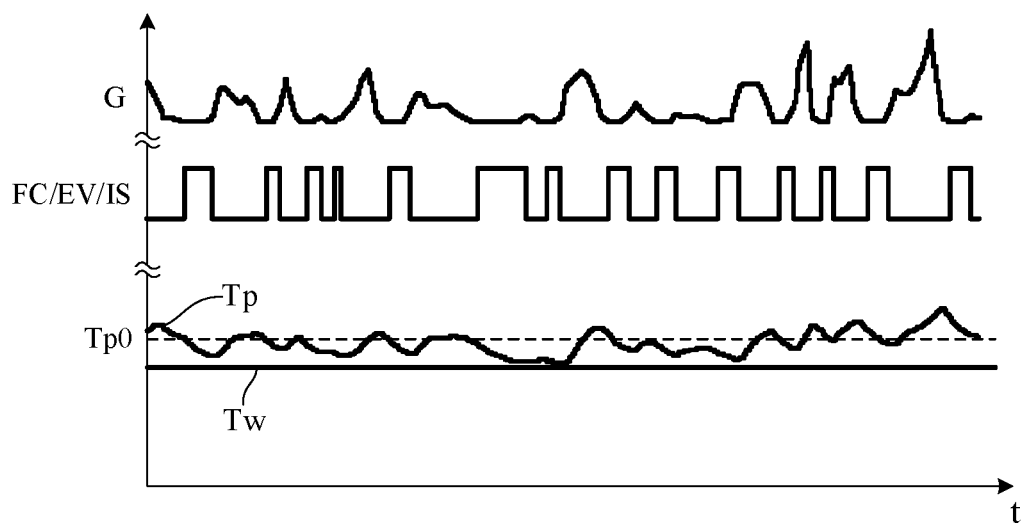
FIG. 13 is a diagram for explaining fall in temperature of the piston crown surface in FIG. 2.

FIG. 13 is a graph showing cooling of the piston crown surface 103a and shows an example of the temperature Tp of the piston crown surface 103a measured when the engine 1 is operated by repeating the normal mode and the F/C mode or operation stop mode. As shown in FIG. 13, during the F/C mode or operation stop mode, the piston crown surface 103a is cooled due to blow-through of the intake air or temporal reductions in the temperature, resulting in reductions in the temperature Tp of the piston crown surface 103a. Specifically, when the operation state is changed to the F/C mode or operation stop mode, the temperature Tp of the piston crown surface 103a may fall below the predetermined temperature Tp0, whether in-cylinder warm-up has been completed thus far.

Figure 14:
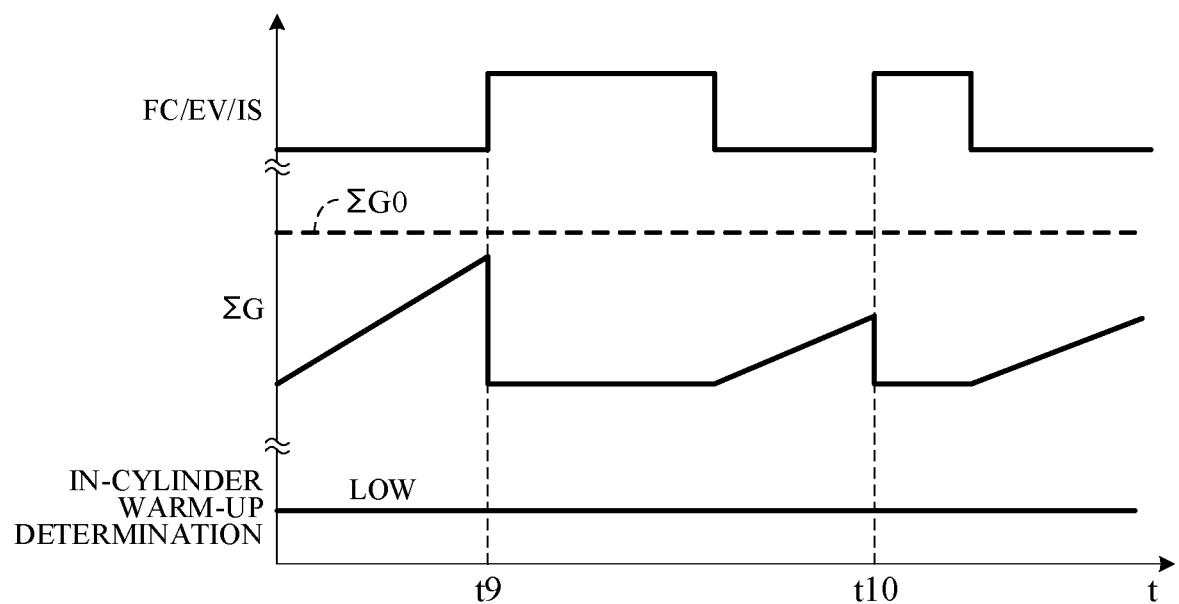
FIG. 14 is a diagram for explaining clearance (zero reset) of the cumulative amount by the cumulative amount calculation unit in FIG. 7.

FIG. 14 is a graph showing the clearance (zero reset) of the cumulative intake air amount ΣG by the cumulative amount calculation unit 502. As shown in FIG. 14, when the operation state is changed to the F/C mode or operation stop mode at time t9 or t10, at which in-cylinder warm-up is not complete, the cumulative intake air amount ΣG is cleared. Also, as shown in FIG. 10, when the operation state is changed to the F/C mode or operation stop mode at time t3 after in-cylinder warm-up is complete, the cumulative intake air amount ΣG is cleared.

Figure 15:
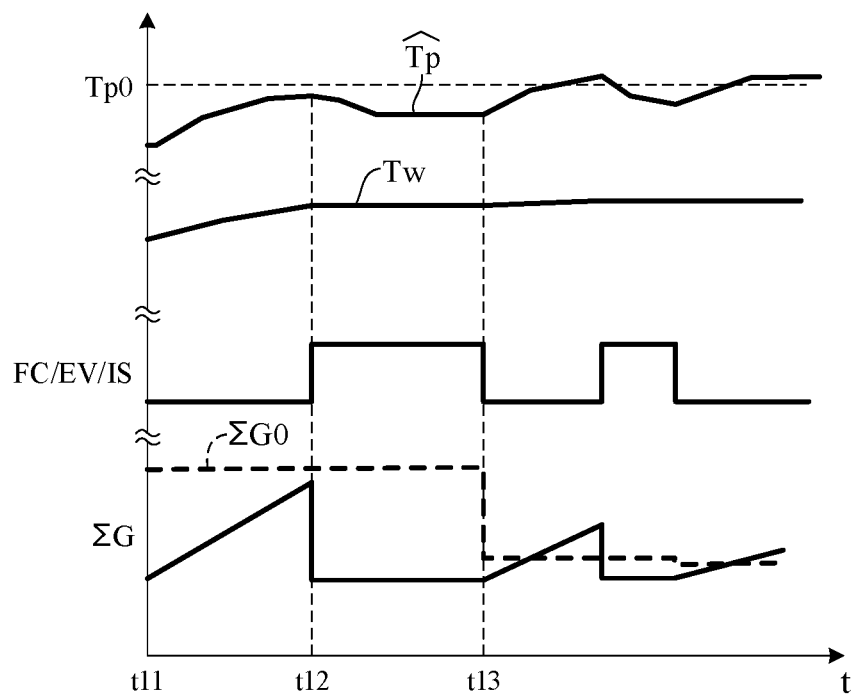
FIG. 15 is a diagram for explaining reset of the threshold value by a threshold setting unit in FIG. 7.

FIG. 15 is a graph showing reset of the threshold value ΣG0 by the threshold setting unit 503. As shown in FIG. 15, when the engine 1 is started from a cold state at time t11, the threshold value ΣG0 corresponding to the cooling water temperature Tw at time t11 is set. When the operation state is changed to the F/C mode or operation stop mode at time t12, the cumulative intake air amount ΣG is cleared. Accordingly, when the operation state returns to the normal mode at time t13, the threshold value ΣG0 corresponding to the cooling water temperature Tw at time t13 is reset. Specifically, the threshold value ΣG0 corresponding to the cooling water temperature Tw at the time of returning to the normal mode is reset in accordance with cooling water temperature Tw-versus-threshold value ΣG0 characteristics as shown in FIG. 9.

As shown in FIG. 9, the cooling water temperature Tw at the time of returning to the normal mode is higher than the cooling water temperature Tw at time of starting from the complete cold state, and the threshold value ΣG0 corresponding to the cooling water temperature Tw at the time of returning to the normal mode is lower than the threshold value ΣG0 corresponding to the cooling water temperature Tw at the time of starting from the complete cold state. The difference ΔΣG0 between the threshold values ΣG0 corresponds to the amount of heat generated by combustion in a period from time t11 to time t12 of FIG. 15 and also corresponds to the workload that has already contributed to increasing the temperature of the piston crown surface 103a. By resetting the threshold value ΣG0 in accordance with the warm-up state of the engine 1 at the time of returning to the normal mode as described above, a workload necessary and sufficient to complete in-cylinder warm-up is set.

Figure 16:
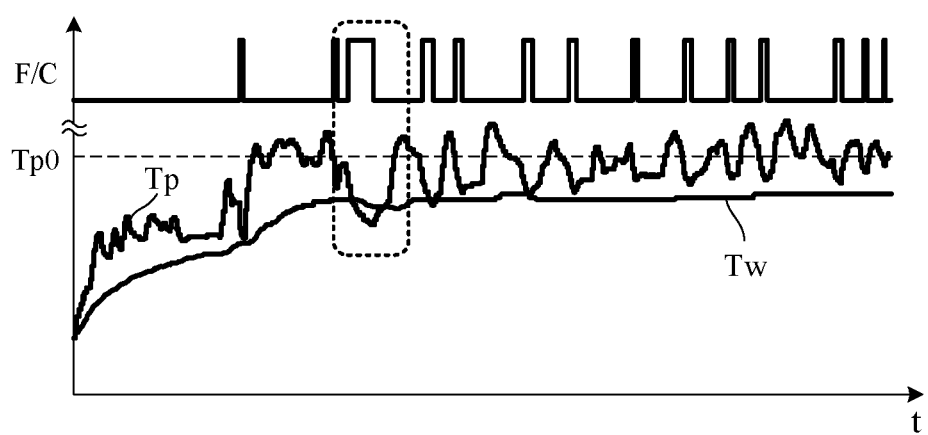
FIG. 16 is a diagram for explaining correction of the threshold value by the threshold setting unit in FIG. 7.

FIG. 16 is a graph showing the correction of the threshold value ΣG0 by the threshold setting unit 503 and shows an example of the temperature Tp of the piston crown surface 103a when the operation state is changed from the normal mode to the F/C mode during warm-up of the engine 1. As shown in FIG. 16, the piston crown surface 103a is cooled due to blow-through of the intake air during the F/C mode and thus the temperature Tp of the piston crown surface 103a may be reduced and fall below the cooling water temperature Tw.

If the mode returns from the F/C mode to the normal mode in this state and the threshold value ΣG0 is reset on the basis of only the cooling water temperature Tw at the time of returning to the normal mode, the workload required to complete in-cylinder warm-up would be underestimated. For this reason, the threshold setting unit 503 corrects the threshold value ΣG0 considering the cooling of the piston crown surface 103a due to blow-through of the intake air during the F/C mode. Specifically, the threshold setting unit 503 corrects the threshold value ΣG0 corresponding to the cooling water temperature Tw at the time of returning to the normal mode by adding a correction value ΣG0c corresponding to the cumulative intake air amount ΣG calculated by the cumulative amount calculation unit 502 during the F/C mode.

Figure 17:
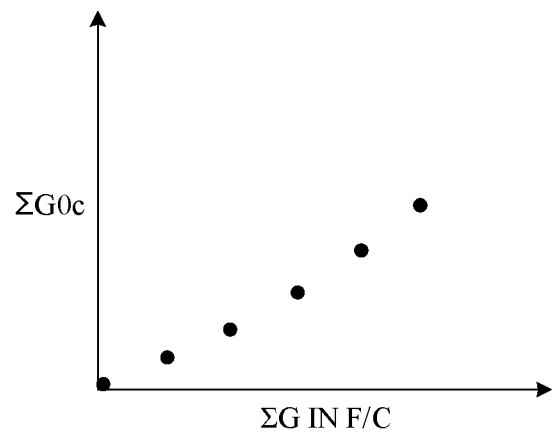
FIG. 17 is a diagram for explaining a correction value of the threshold value by the threshold setting unit in FIG. 7.

FIG. 17 is a graph showing the correction value ΣG0c of the threshold value ΣG0 and shows characteristics of the correction value ΣG0c of the threshold value ΣG0 corresponding to the cumulative intake air amount ΣG during the F/C mode when the operation state is changed from the normal mode to the F/C mode with the cooling water temperature Tw warmed up to a predetermined temperature. As shown in FIG. 17, the correction value ΣG0c of the threshold value ΣG0 reset after returning to the normal mode is increased as the cumulative intake air amount ΣG during the F/C mode is increased.

Characteristics of the correction value ΣG0c of the threshold value ΣG0 corresponding to the cumulative intake air amount ΣG during the F/C mode as shown in FIG. 17 are previously set on the basis of test results obtained by conducting confirmation tests as shown in FIG. 16 with different cooling water temperatures Tw at the time of changing the operation state from the normal mode to the F/C mode, and previously stored in the memory. After returning to the normal mode, the threshold setting unit 503 resets the threshold value ΣG0 by adding the correction value ΣG0c calculated on the basis of the characteristics of FIG. 17 to the threshold value ΣG0 corresponding to the cooling water temperature Tw at the time of returning to the normal mode calculated on the basis of the characteristics of FIG. 9.

Figure 18:
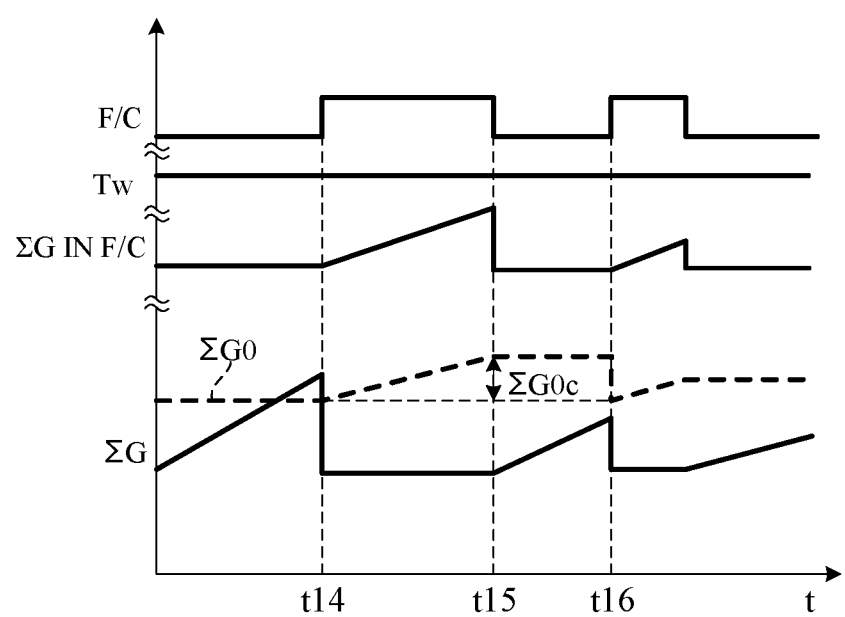
FIG. 18 is a diagram for explaining correction and reset of the threshold value by the threshold setting unit in FIG. 7.

FIG. 18 is a graph showing the correction and reset of the threshold value ΣG0 by the threshold setting unit 503. As shown in FIG. 18, when the operation state is changed from the normal mode to the F/C mode at time t14, the cumulative intake air amount ΣG for an in-cylinder warm-up determination is cleared and accumulation of the amounts of intake air during the F/C mode is started. When the operation state returns from the F/C mode to the normal mode at time t15, the threshold value ΣG0 is reset on the basis of the cooling water temperature Tw at the time of the change to the F/C mode, the cumulative intake air amount ΣG during the F/C mode, and the cooling water temperature Tw at the time of returning to the normal mode.

As shown in FIG. 16, when the operation state returns from the F/C mode to the normal mode, the temperature Tp of the piston crown surface 103a shortly recovers and rises above the cooling water temperature Tw. For this reason, the correction of the threshold value ΣG0 due to blow-through of the intake air during the F/C mode is applied to only a period from the return to the normal mode to the next change to the F/C mode (in an example in FIG. 18, a period from time t15 to time t16), and the correction value ΣG0c is cleared when the operation state is next changed to the F/C mode (time t16).

Figure 19:
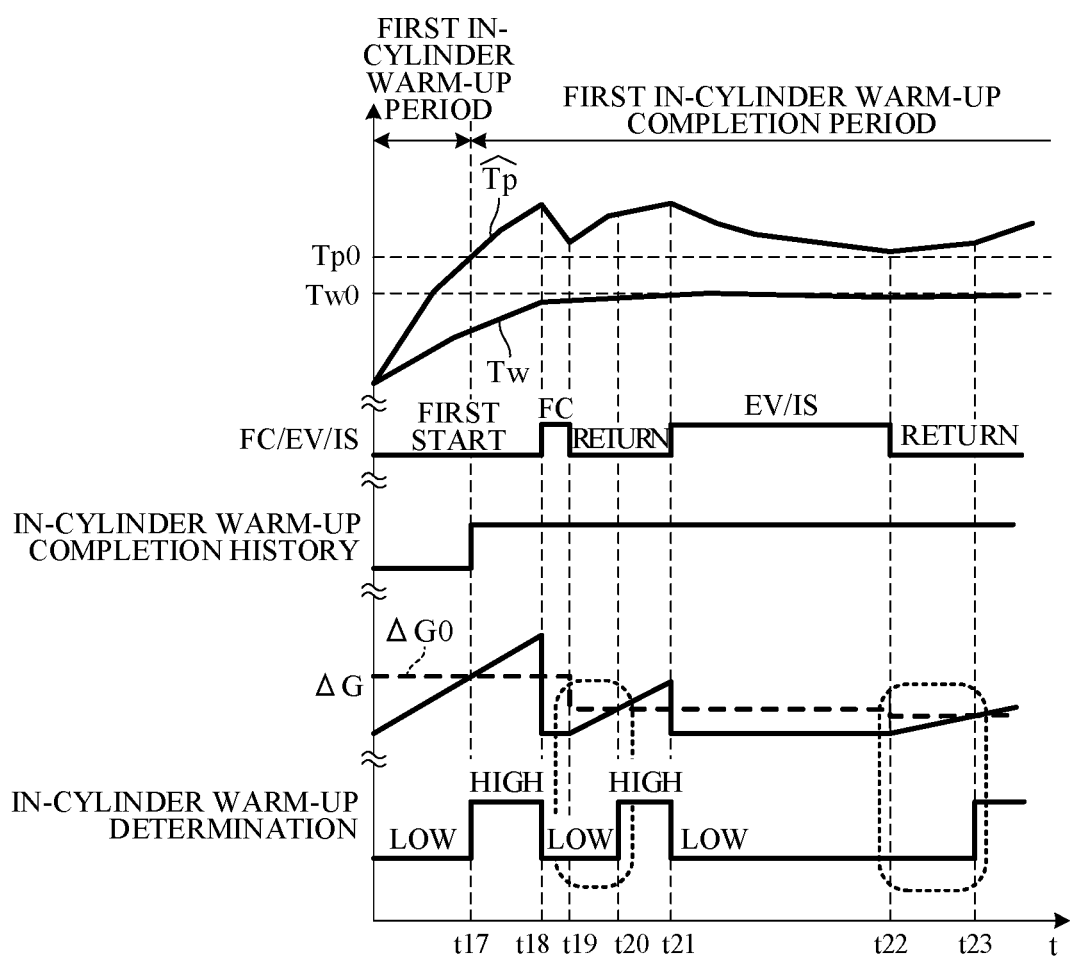
FIG. 19 is a diagram for explaining reset of the threshold value corresponding to an in-cylinder warm-up completion history by the threshold setting unit in FIG. 7.

FIG. 19 is a graph showing reset of the threshold value ΣG0 by the threshold setting unit 503 and shows reset of the threshold value ΣG0 corresponding to whether an in-cylinder warm-up completion history is present. As shown in FIG. 19, at time t17, the cumulative intake air amount ΣG reaches the threshold value ΣG0m, and the temperature Tp of the piston crown surface 103a reaches the predetermined temperature Tp0 (e.g., 100° C.). Subsequently, the temperature Tp remains high temperatures in accordance with the engine operation state. On the other hand, when the engine 1 is warmed up, the cooling water passes through a radiator and thus the cooling water temperature Tw is maintained at a predetermined temperature Tw0 (e.g., 90° C.) or less.

Even if the operation state is changed to the F/C mode or operation stop mode (EV mode or I/S mode) in the first in-cylinder warm-up completion period as described above, the temperature Tp of the piston crown surface 103a remains higher temperatures than the cooling water temperature Tw as long as the time during which those modes continue is short.

More specifically, in the F/C mode from time t18 to time t19, the intake air is blown through and thus the inside of the cylinder is cooled, but the high in-cylinder temperature state is maintained unless the cumulative intake air amount ΣG reaches the predetermined value ΣGc during the F/C mode. Also, in the operation stop mode from time t21 to time t22, heat is not generated by combustion and the in-cylinder temperature is reduced with time, but the high in-cylinder temperature state is maintained until the elapsed time period Δt since the change to the operation stop mode reaches the predetermined time period Δtc.

Accordingly, if the operation state returns from such a short F/C mode or operation stop mode to the normal mode and the threshold value ΣG0 is reset on the basis of only the cooling water temperature Tw at the time of returning to the normal mode, the workload required to complete in-cylinder warm-up would be overestimated. In other words, the in-cylinder temperature at the time of returning to the normal mode would be underestimated as being equivalent to the cooling water temperature Tw, and an excessive threshold value ΣG0 corresponding to a workload for increasing the temperature from the cooling water temperature Tw at the time of returning to the normal mode to the predetermined temperature Tp0 would be reset.

Thus, in a period from time t19 to time t20 and a period from time t22 to time t23 after returning to the normal mode, the temperature range determination unit 501 would determine that the inside of the cylinder is in a low in-cylinder temperature state, regardless of the actual in-cylinder temperature. As a result, the injection mode would be controlled to the adherence reduction mode M3, which aims to reduce soot, rather than the uniformity improvement mode M4, in which the fuel efficiency is optimized, as shown in FIG. 4 and thus an increase in the fuel efficiency would be prevented.

For this reason, the threshold setting unit 503 switches between the methods to reset the threshold value ΣG0 when returning to the normal mode, in accordance with whether an in-cylinder warm-up completion history (in-cylinder warm-up completion history flag) is present when the operation state is changed to the F/C mode or operation stop mode. Specifically, at the time of returning to the normal mode (cold start mode) after changing the operation state to the F/C mode or operation stop mode in the first in-cylinder warm-up period, in which the in-cylinder warm-up completion history flag is "0," such as time t13 of FIG. 15), a threshold value ΣG01 for the first in-cylinder warm-up period is used. On the other hand, at the time of returning to the normal mode after changing the operation state to the F/C mode or operation stop mode in the first in-cylinder warm-up completion period, in which the in-cylinder warm-up completion history flag is "1," such as time t5 of FIG. 10, a threshold value ΣG02 or threshold value ΣG03 for the first in-cylinder warm-up completion period is used.

The threshold value ΣG01 at the time of returning to the normal mode in the first in-cylinder warm-up period is reset in accordance with the cooling water temperature Tw at the time of returning to the normal mode on the basis of the characteristics of FIG. 9, as is done at the time of the first start. On the other hand, the threshold value ΣG02 and threshold value ΣG03 used at the time of returning to the normal mode in the first in-cylinder warm-up completion period are reset considering cooling of the inside of the cylinder in the warm-up state.

Figure 20:
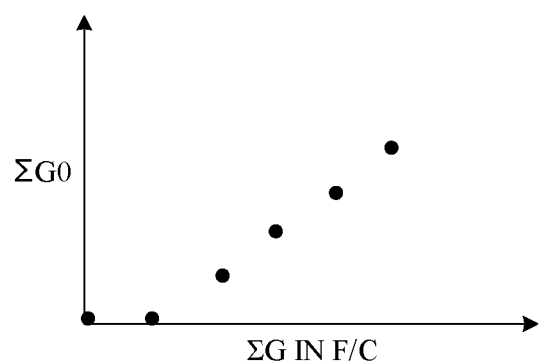
FIG. 20 is a diagram for explaining the threshold value reset by the threshold setting unit in FIG. 7, when returning from F/C mode to normal mode in first in-cylinder warm-up completion period.
Figure 21:
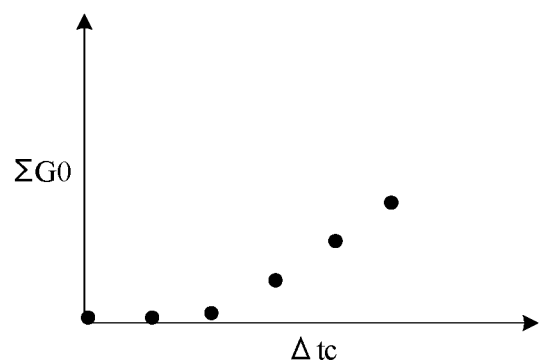
FIG. 21 is a diagram for explaining the threshold value reset by the threshold setting unit in FIG. 7, when returning from operation stop mode to the normal mode in the first in-cylinder warm-up completion period.

FIG. 20 is a graph showing the threshold value ΣG02 reset by the threshold setting unit 503 when returning from the F/C mode to the normal mode in the first in-cylinder warm-up completion period. FIG. 21 is a graph showing the threshold value ΣG03 reset by the threshold setting unit 503 when returning from the operation stop mode to the normal mode in the first in-cylinder warm-up completion period.

As shown in FIG. 20, the threshold value ΣG02 reset after returning from the F/C mode to the normal mode in the first in-cylinder warm-up completion period is increased as the cumulative intake air amount ΣG during the F/C mode is increased, considering cooling of the inside of the cylinder in the warm-up state due to blow-through of the intake air. More specifically, the threshold value ΣG02 is increased with increases in the cumulative intake air amount ΣG during the F/C mode after the in-cylinder warm-up completion determination is withdrawn.

Also, as shown in FIG. 21, the threshold value ΣG03 reset after returning from the operation stop mode to the normal mode in the first in-cylinder warm-up completion period is increased as the elapsed time period Δt since the change to the operation stop mode is increased, considering temporal reductions in the temperature during the operation stop mode. More specifically, the threshold value ΣG03 is increased with increases in the elapsed time period Δt in the operation stop mode after the in-cylinder warm-up completion determination is withdrawn.

Characteristics of the threshold values ΣG02 and ΣG03 reset when returning to the normal mode in the first in-cylinder warm-up completion period as shown in FIGS. 20 and 21 are previously determined by conducting a confirmation test in a state in which the engine 1 is warmed up and the cooling water temperature Tw is stabilized and are previously stored in the memory. When the operation state returns to the normal mode in the first in-cylinder warm-up period (cold start mode), the threshold setting unit 503 resets the threshold value ΣG01 for the first in-cylinder warm-up period in accordance with the cooling water temperature Tw at the time of returning to the normal mode on the basis of the characteristics of FIG. 9. Also, when the operation state returns to the normal mode in the first in-cylinder warm-up completion period, the threshold setting unit 503 resets the threshold value ΣG02 or threshold value ΣG03 for the first in-cylinder warm-up completion period considering cooling of the inside of the cylinder in the warm-up state on the basis of the characteristics of FIG. 20 or 21.

Figure 22:
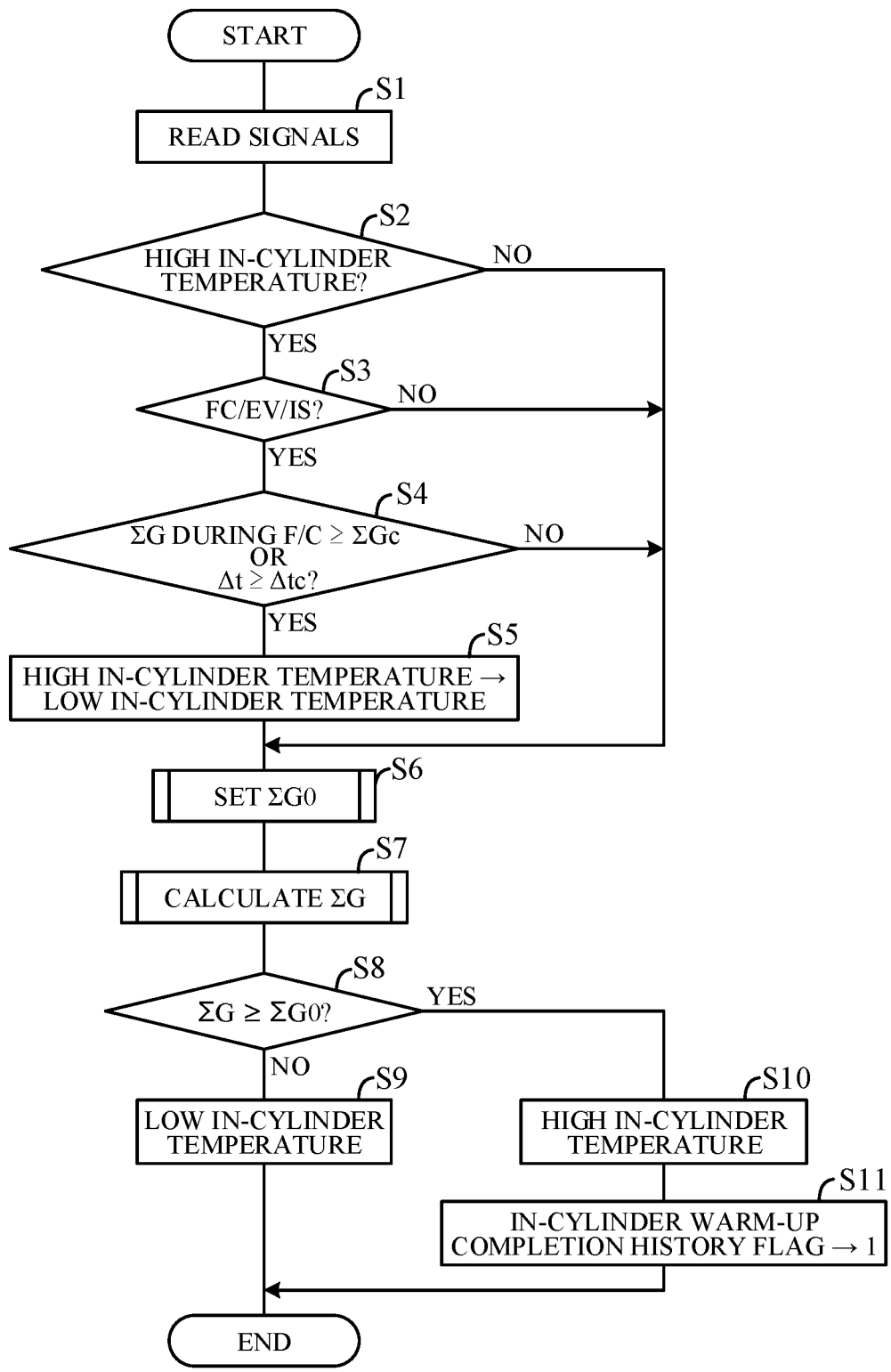
FIG. 22 is a flowchart showing an example of an in-cylinder warm-up determination process performed by a controller in FIG. 7.
Figure 23:
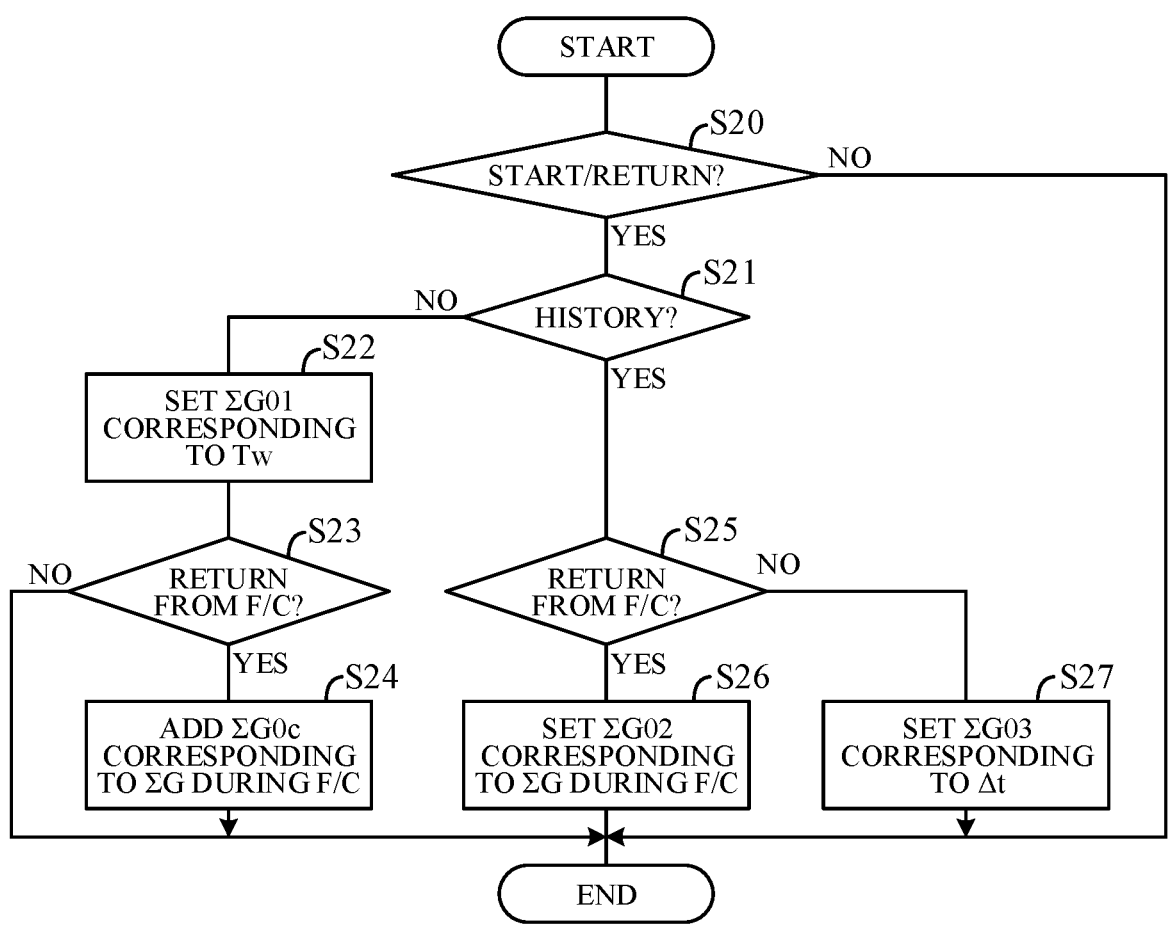
FIG. 23 is a flowchart showing an example of a threshold value setting process performed by the controller in FIG. 7.
Figure 24:
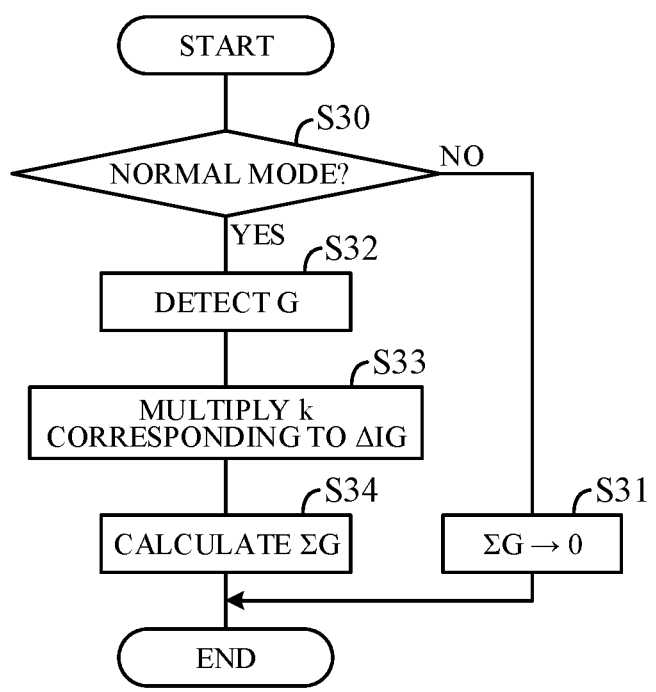
FIG. 24 is a flowchart showing an example of a cumulative amount calculation process performed by the controller in FIG. 7.

FIGS. 22 to 24 are flowcharts showing an example of processes performed by the controller 30 in accordance with a program previously stored in the memory. For example, the processes shown in these flowcharts are started when a command to start the engine 1 is issued in response to turn-on of the ignition switch, and repeated in a predetermined cycle.

As shown in FIG. 22, first, in S1 (S: a process step), the controller 30 reads signals from the crank angle sensor 31, water temperature sensor 33, and intake air amount sensor 34. Then, in S2, the controller 30 determines whether the last in-cylinder warm-up determination is a "high in-cylinder temperature state." At the initial time point, the last in-cylinder warm-up determination is a "low in-cylinder temperature state." If the determination in S2 is YES, the process proceeds to S3; if the determination in S2 is NO, the process skips S3 to S5 and proceeds to S6.

Then, in S3, the controller 30 determines whether the engine operation state is the F/C mode or operation stop mode. If the determination in S3 is YES, the process proceeds to S4; if the determination in S3 is NO, the process skips S4 and S5 and proceeds to S6. Then, in S4, the controller 30 determines whether the cumulative intake air amount $\Sigma G$ during the F/C mode is equal to or larger than the predetermined value $\Sigma Gc$ or whether the elapsed time period $\Delta t$ since the change to the operation stop mode is equal to or longer than the predetermined time period $\Delta tc$. If the determination in S4 is YES, the process proceeds to S5; if the determination in S4 is NO, the process skips S5 and proceeds to S6. In S5, the controller 30 withdraws the in-cylinder warm-up completion determination and changes the in-cylinder warm-up determination to a "low in-cylinder temperature state."

Then, the controller 30 sets the threshold value $\Sigma G0$ for an in-cylinder warm-up determination in S6, calculates the cumulative intake air amount $\Sigma G$ for an in-cylinder warm-up determination in S7, and makes an in-cylinder warm-up determination in S8. In S8, the controller 30 determines whether the cumulative intake air amount $\Sigma G$ calculated in S7 is equal to or larger than the threshold value $\Sigma G0$ set in S6. If the determination in S8 is NO, the process proceeds to S9 and the controller 30 determines that the engine 1 is in a "low in-cylinder temperature state." On the other hand, if the determination in S8 is YES, the process proceeds to S10. The controller 30 determines that the engine 1 is in a "high in-cylinder temperature state." Then, in S11, it sets the in-cylinder warm-up completion history flag to 1.

FIG. 23 is a flowchart showing an example of a threshold value setting process corresponding to S6 of the flowchart of FIG. 22. As shown in FIG. 23, first, in S20, the controller 30 determines whether the engine 1 has started from a complete cold state, returned from the F/C mode to the normal mode, or returned from the operation stop mode to the normal mode. If the determination in S20 is YES, the process proceeds to S21; if the determination in S20 is NO, the process skips S21 to S25 and is ended.

In S21, the controller 30 determines whether the in-cylinder warm-up completion history flag is "1." If the determination in S21 is NO, the process proceeds to S22 to S24 and the controller 30 sets the threshold value $\Sigma G01$ for the first in-cylinder warm-up period. If the determination in S21 is YES, the process proceeds to S25 to S27 and the controller 30 sets the threshold value $\Sigma G02$ or threshold value $\Sigma G03$ for the first in-cylinder warm-up completion period.

In S22, the controller 30 sets the threshold value $\Sigma G01$ corresponding to the cooling water temperature Tw on the basis of the characteristics of FIG. 9. Then, in S23, the controller 30 determines whether the operation state has returned from the F/C mode to the normal mode. If the determination in S23 is NO, the controller 30 confirms the threshold value $\Sigma G01$ set in S22 as the threshold value $\Sigma G0$, ending the process. If the determination in S23 is YES, the process proceeds to S24. The controller 30 adds the correction value $\Sigma G0c$ corresponding to the cumulative intake air amount $\Sigma G$ during the F/C mode to the threshold value $\Sigma G01$ set in S22 and confirms the resulting threshold value as the threshold value $\Sigma G0$, ending the process.

In S25, the controller 30 determines whether the operation state has returned from the F/C mode to the normal mode. If the determination in S25 is YES, the process proceeds to S26. The controller 30 sets the threshold value $\Sigma G02$ corresponding to the cumulative intake air amount $\Sigma G$ during the F/C mode as the threshold value $\Sigma G0$ on the basis of the characteristics of FIG. 20, ending the process. If the determination in S25 is NO, the process proceeds to S27. The controller 30 sets the threshold value $\Sigma G03$ corresponding to the elapsed time period $\Delta t$ since the change to the operation stop mode as the threshold value $\Sigma G0$ on the basis of the characteristics of FIG. 21, ending the process.

FIG. 24 is a flowchart showing an example of a cumulative amount calculation process corresponding to S7 of the flowchart of FIG. 22. As shown in FIG. 24, first, in S30, the controller 30 determines whether the engine operation state is the normal mode. If the determination in S30 is NO, the process proceeds to S31. The controller 30 clears or resets the cumulative intake air amount $\Sigma G$ to "0," ending the process. If the determination in S30 is YES, the process proceeds to S32.

In S32, the controller 30 detects the intake air amount G on the basis of signals from the intake air amount sensor 34. Then, in S33, the controller 30 multiplies the intake air amount G detected in S32 by the correction coefficient k corresponding to the amount of retardation $\Delta IG$. Then, in S34, the controller 30 calculates the current cumulative intake air amount $\Sigma G$ by adding the current intake air amount G corrected in S33 to the last cumulative intake air amount $\Sigma G$, ending the process.

Figure 25:
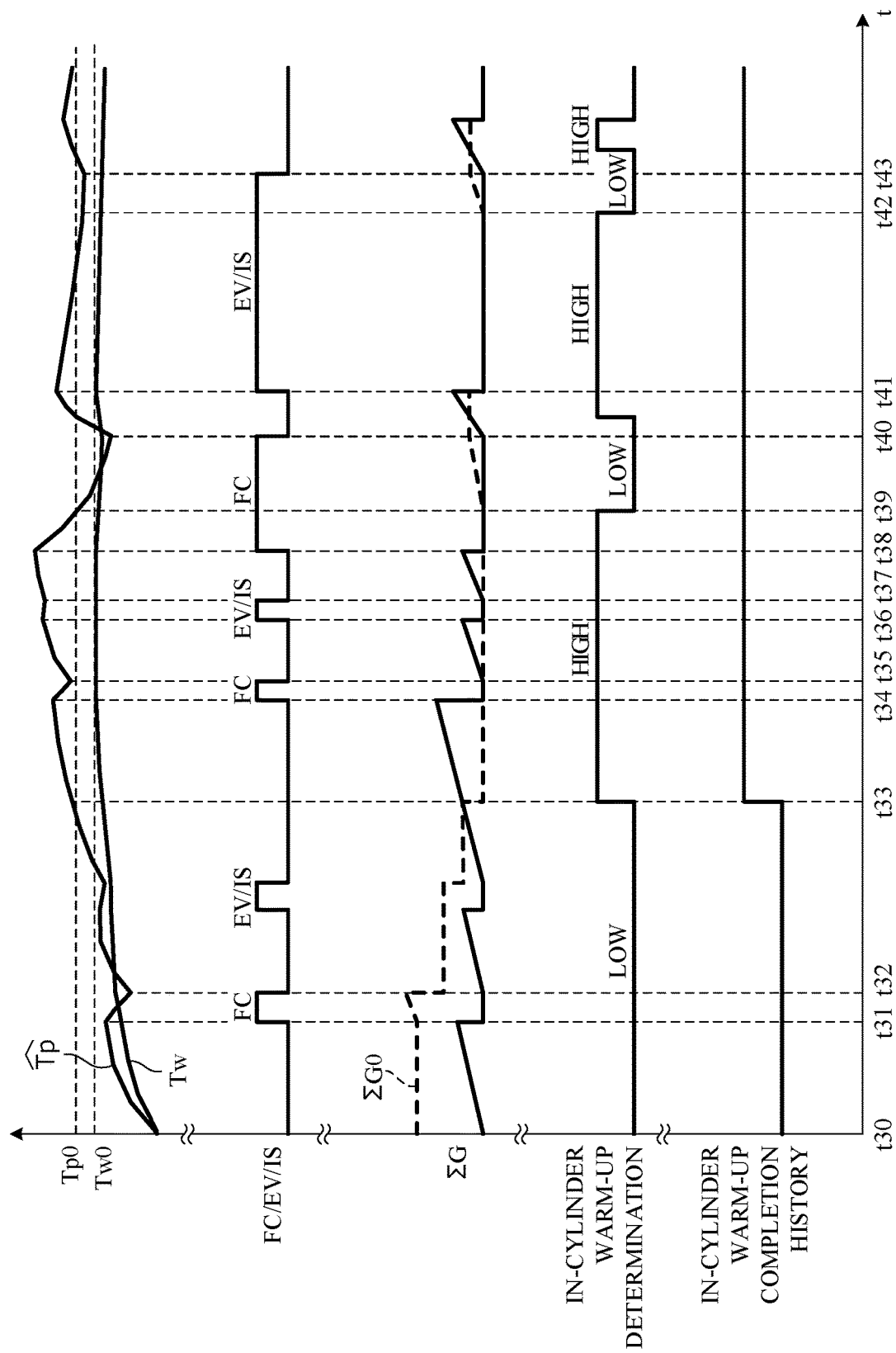
FIG. 25 is a time chart showing an example of operation of the temperature acquisition apparatus for internal combustion engine according to the embodiment of the present invention.

Referring to FIG. 25, the main operation of the control apparatus according to the present embodiment will be described more specifically. At time t30, the engine 1 is started from a complete cold state, and the control apparatus sets the threshold value $\Sigma G01$ corresponding to the cooling water temperature Tw at the start on the basis of the characteristics of FIG. 9 (S20 to S22). Since the control apparatus previously checks the cumulative intake air amount $\Sigma G$, which is the workload of the engine 1 required to warm up the piston crown surface 103a, considering the heat capacity of the piston 103 or the like (FIG. 8), it is able to set the threshold value $\Sigma G0$ that allows for reliably warming up the inside of the cylinder in accordance with the cold state of the engine 1.

When the operation state is changed from the normal mode to the F/C mode at time t31, the control apparatus clears the cumulative intake air amount $\Sigma G$ (S30 to S31). Since, in the F/C mode or operation stop mode, the engine 1 does not work and the intake air amount G does not contribute to increasing the temperature of the piston crown surface 103a, the control apparatus clears the cumulative intake air amount G.

At time t31 in the first in-cylinder warm-up period, the operation state is changed to the F/C mode. Then, at time t32, the operation state returns to the normal mode, and the control apparatus adds the correction value $\Sigma G0c$ corresponding to the cumulative intake air amount $\Sigma G$ during the F/C mode to the threshold value $\Sigma G01$ corresponding to the cooling water temperature Tw at the time of returning to the normal mode (S20 to S24). Since the control apparatus sets the threshold value $\Sigma G0$ in accordance with the cold state of the engine 1 and considers cooling of the inside of the piston due to blow-through of the intake air during the F/C mode, it is able to more reliably warm up the inside of the cylinder.

When the cumulative intake air amount $\Sigma G$ reaches the threshold value $\Sigma G0$ at time t33, the control apparatus determines that the engine 1 has reached a high in-cylinder temperature state, completes the first in-cylinder warm-up, and clears the threshold value $\Sigma G0$ (S8, S10 to S11). When the in-cylinder temperature reaches a necessary and sufficient temperature to make it difficult to form soot, the injection mode is switched from the adherence reduction mode M3, which aims to reduce soot, to the uniformity improvement mode M4, in which the fuel efficiency is optimized. Thus, both suppression of soot and an improvement in the fuel efficiency are achieved (FIG. 4).

When, in a period from time t34 to time t35, which is the first in-cylinder warm-up completion period, the operation state returns to the normal mode before the cumulative intake air amount $\Sigma G$ during the F/C mode reaches the predetermined value $\Sigma Gc$, the in-cylinder warm-up determination is not withdrawn but rather maintained (S2 to S4). Also, when, in a period from time t36 to time t37, the operation state returns to the normal mode before the elapsed time period $\Delta t$ in the operation stop mode reaches the predetermined time period $\Delta tc$, the in-cylinder warm-up determination is not withdrawn but rather maintained (S2 to S4). Even if the piston crown surface 103a is temporarily cooled due to blow-through of the intake air or temporal reductions in the temperature in the first in-cylinder warm-up completion period, the entire piston 103 having a given heat capacity is not immediately cooled. For this reason, when the F/C mode or operation stop mode is performed for a short time, the in-cylinder warm-up determination is not withdrawn.

On the other hand, when the cumulative intake air amount $\Sigma G$ during the F/C mode reaches the predetermined value $\Sigma Gc$ in a period from time t38 to time t39, the in-cylinder warm-up determination is withdrawn (S2 to S5). Similarly, when the elapsed time period $\Delta t$ in the operation stop mode reaches the predetermined time period $\Delta tc$ in a period from time t41 to time t42, the in-cylinder warm-up determination is withdrawn and it is determined that the engine 1 is in a low in-cylinder temperature (S2 to S5). Thus, the injection mode is switched to the adherence reduction mode M3, which aims to reduced soot. As a result, soot emission is suppressed after the operation state returns to the normal mode at time t40 or t43 (FIG. 4).

When the operation state is changed to the F/C mode at time t38 in the first in-cylinder warm-up completion period and then the operation state returns to the normal mode at time t40, the threshold value $\Sigma G02$ corresponding to cooling of the inside of the cylinder in the warm-up state in a period from time t39 to time t40 is set on the basis of the characteristics of FIG. 20 (S20 and S21, S25 and S26). Similarly, when the operation state is changed to the operation stop mode at time t41 in the first in-cylinder warm-up completion period and then the operation state returns to the normal mode at time t43, the threshold value $\Sigma G03$ corresponding to cooling of the inside of the cylinder in a period from time t42 to time t43 is set on the basis of the characteristics of FIG. 21 (S20 and S21, S25, S27). Since the method to set the threshold value $\Sigma G0$ at the time of returning to the normal mode is changed in accordance with whether an in-cylinder warm-up completion history is present when changing the operation state to the F/C mode or operation stop mode, the workload required to complete in-cylinder warm-up is not overestimated and an improvement in the fuel efficiency is not prevented.

The present embodiment can achieve advantages and effects such as the following:

(1) The apparatus 50 is configured to acquire the temperature of the combustion chamber 105 of the engine 1 (FIG. 2). The apparatus 50 includes: the intake air amount sensor 34 configured to acquire the intake air amount G of the engine 1; the cumulative intake air amount calculation unit 502 configured to calculate the cumulative intake air amount $\Sigma G$ of the intake air amount G based on the intake air amount G acquired by the intake air amount sensor 34; and the temperature range determination unit 501 configured to acquire the temperature of the engine 1 based on the cumulative intake air amount $\Sigma G$ calculated by the cumulative intake air amount calculation unit 502 (FIG. 7). Specifically, the apparatus 50 acquires the temperature (information on the temperature state) of the engine 1 on the basis of the cumulative intake air amount $\Sigma G$ (workload) of the amounts of intake air G of the engine 1 that contributes to increasing the temperature of the engine 1 including the component, such as the piston 103, that has the heat capacity corresponding to the material and mass. Thus, the apparatus 50 is able to acquire the temperature that properly reflects the temperature of the combustion chamber 105 ranging from that in the cold state of the engine 1 to that in the warm-up state thereof considering the surface temperature of the component having the heat capacity.

(2) The temperature range determination unit 501 acquires the temperature of the engine 1 by determining whether the engine 1 is in the high in-cylinder temperature state in which the piston crown surface 103a of the piston 103 constituting the combustion chamber 105 is the predetermined temperature Tp0 or higher based on the cumulative intake air amount $\Sigma G$ calculated by the cumulative intake air amount calculation unit 502. Thus, the apparatus 50 is able to easily acquire the temperature of the combustion chamber 105 without having to directly detect the temperature Tp of the piston crown surface 103a using a sensor.

(3) The apparatus 50 further includes: the threshold setting unit 503 configured to set the threshold value $\Sigma G0$ of the cumulative intake air amount $\Sigma G$ calculated by the cumulative intake air amount calculation unit 502 (FIG. 7). The temperature range determination unit 501 determines whether the cumulative intake air amount $\Sigma G$ calculated by the cumulative intake air amount calculation unit 502 is equal to or larger than the threshold value $\Sigma G0$ set by the threshold setting unit 503, and determines that the engine 1 is in the high in-cylinder temperature state when it is determined that the cumulative intake air amount $\Sigma G$ is equal to or larger than the threshold value $\Sigma G0$.

For example, the threshold setting unit 503 sets, as the threshold value $\Sigma G0$, the cumulative intake air amount $\Sigma G$ required to warm up the engine 1 to the extent that almost no soot is emitted. Thus, the temperature range determination unit 501 determines whether the temperature Tp of the piston crown surface 103a has reached the predetermined temperature Tp0 (e.g., 100° C.) at which adhering fuel can immediately evaporate, without having to directly detect the temperature Tp of the piston crown surface 103a using a sensor.

(4) The apparatus 50 further includes: the water temperature sensor 33 configured to detect the cooling water temperature Tw of the engine 1 (FIG. 7). The threshold setting unit 503 sets the threshold value $\Sigma G0$ so that the threshold value $\Sigma G0$ becomes smaller as the cooling water temperature TW is higher based on the cooling water temperature Tw detected by the water temperature sensor 33. By considering the cooling water temperature Tw, the apparatus 50 is able to prevent setting of an excessive threshold value $\Sigma G0$ on the cumulative intake air amount $\Sigma G$ required to warm up the engine 1 and thus to suppress deterioration of the fuel efficiency due to excessive warm-up operation.

(5) The apparatus 50 further includes: the information acquisition unit 504 configured to acquire the ignition timing IG of the engine 1 (FIG. 7). The cumulative intake air amount calculation unit 502 corrects the cumulative intake air amount $\Sigma G$ so that increment of the cumulative intake air amount becomes smaller as the ignition timing IG is retarded from the optimum ignition timing MBT based on the ignition timing IG acquired by the information acquisition unit 504.

Specifically, in the catalyst warming mode M2, the apparatus 50 retards the ignition timing from the optimum ignition timing MBT so that the mixture is combusted later and thus uses the amount of heat generated by combustion, that is, a part of the workload of the engine 1 to increase the temperature of the catalyst device 13 rather than the piston crown surface 103*a*. By determining the in-cylinder warm-up state considering the workload that does not contribute to increasing the temperature of the piston crown surface 103*a*, as described above, the apparatus 50 is able to properly acquire the temperature of the combustion chamber 105.

(6) The apparatus 50 further includes: the operation state determination unit 505 configured to determine the engine operation state from among the engine operation states including the normal mode in which the engine 1 performs air intake and fuel injection and the F/C mode in which the engine 1 performs only air intake (FIG. 7). The cumulative intake air amount calculation unit 502 clears the cumulative intake air amount ΣG when the engine operation state is changed from the normal mode to the F/C mode or the operation stop mode based on the determination result by the operation state determination unit 505. Specifically, in the F/C mode or operation stop mode, the engine 1 does not work and the intake air amount G does not contribute to increasing the temperature of the piston crown surface 103*a* and therefore the cumulative amount calculation unit 502 clears the cumulative intake air amount G.

(7) The threshold setting unit 503 resets the threshold value ΣG0 so that the threshold value ΣG0 becomes larger as the cumulative intake air amount ΣG calculated by the cumulative amount calculation unit 502 during when the engine operation state is the F/C mode is larger, when the engine operation state is changed from the F/C mode to the normal mode based on the determination result by the operation state determination unit 505.

In the F/C mode, intake of air into the cylinder 102 is continued, and the piston crown surface 103*a* is cooled due to blow-through of the intake air. That is, the intake air amount G contributes to cooling the piston crown surface 103*a* rather than increasing the temperature thereof. By determining the in-cylinder warm-up state considering the cumulative intake air amount ΣG during the F/C mode, which contributes to cooling the piston crown surface 103*a*, as described above, the apparatus 50 is able to properly acquire the temperature of the combustion chamber 105.

(8) The engine operation states further include: the cold start mode in which the engine 1 starts from the cold state. The threshold setting unit 503 sets the threshold value ΣG0 to the threshold value ΣG01 for the first in-cylinder warm-up period when it is determined by the operation state determination unit 505 that the engine operation state is the cold start mode, and then sets the threshold value ΣG0 to the threshold value ΣG02 or ΣG03 for the first in-cylinder warm-up completion period smaller than the threshold value ΣG01 for the first in-cylinder warm-up period when it is determined by the temperature range determination unit 501 that the engine 1 is in the high in-cylinder temperature state.

Once the piston crown surface 103*a* is increased in temperature so as to exceed the cooling water temperature Tw and reaches a high in-cylinder temperature state, the entire piston 103 having the heat capacity corresponding to the material and mass is not immediately cooled even if the piston crown surface 103*a* is temporality cooled due to the F/C mode or the like. For example, if the F/C mode or the like is performed for a predetermined time or more after the piston crown surface 103*a* reaches a high in-cylinder temperature state, the apparatus 50 determines the in-cylinder warm-up state considering cooling of the inside of the cylinder due to blow-through of the intake air and thus is able to properly acquire the temperature of the combustion chamber 105.

(9) The engine operation states further include: the operation stop mode in which the engine 1 stops both air intake and fuel injection. The temperature range determination unit 501 determines whether the cumulative intake air amount ΣG calculated by the cumulative intake air amount calculation unit 502 after the engine operation state is changed to the F/C mode is equal to or larger than the predetermined value ΣGc, when it is determined by the operation state determination unit 505 that the engine operation state is the F/C mode, and determines that the engine 1 is in the low in-cylinder temperature state when the cumulative intake air amount ΣG calculated by the cumulative intake air amount calculation unit 502 after the engine operation state is changed to the F/C mode is equal to or larger than the predetermined value ΣGc.

The temperature range determination unit 501 determines whether the elapsed time period Δt after the engine operation state is changed to the operation stop mode is equal to or longer than the predetermined time period Δtc, and determines that the engine 1 is in the low in-cylinder temperature state when it is determined by the operation state determination unit 505 that the engine operation state is the operation stop mode when it is determined that the elapsed time period Δt after the engine operation state is changed to the operation stop mode is equal to or longer than the predetermined time period Δtc.

The threshold setting unit 503 sets the threshold value ΣG02 for the first in-cylinder warm-up completion period based on the cumulative intake air amount ΣG calculated by the cumulative intake air amount calculation unit 502 after the engine operation state is changed to the F/C mode. Otherwise, the threshold setting unit 503 sets the threshold value ΣG03 for the first in-cylinder warm-up completion period based on the elapsed time period Δt after the engine operation state is changed to the operation stop mode.

If the engine 1 reaches a high in-cylinder temperature state and then returns to a low in-cylinder temperature state due to being placed in the F/C mode for a predetermined time or more, the apparatus 50 determines the in-cylinder warm-up state considering cooling of the inside of the cylinder due to blow-through of the intake air in the F/C mode. Also, if the engine 1 returns to a low in-cylinder temperature state due to being placed in the operation stop mode for a predetermined time or more, the apparatus 50 determines the in-cylinder warm-up state considering temporal reductions in the temperature in the operation stop mode. Thus, the apparatus 50 is able to properly acquire the temperature of the combustion chamber 105.

(10) The apparatus 50 is configured to estimate the temperature of the combustion chamber 105 of the engine 1. The apparatus 50 includes: the temperature range determination unit 501 configured to determine whether the engine 1 is in the high in-cylinder temperature state in which the piston crown surface 103*a* of the piston 103 constituting the combustion chamber 105 is the predetermined temperature Tp0 or higher based on the intake air amount G as a parameter regarding the engine output torque or the engine work load (FIG. 7).

Specifically, the apparatus 50 determines the in-cylinder warm-up state on the basis of a physical quantity (parameter) having a correlation with the output torque of the engine 1 that contributes to increasing the temperature of the piston crown surface 103a, which is the surface of the piston 103 having the heat capacity corresponding to the material and mass. Thus, the apparatus 50 is able to properly estimate the temperature of the combustion chamber 105 ranging from that in the in-cylinder cold state to that in the in-cylinder warm-up state.

While, in the above embodiment, the temperature acquisition apparatus acquires the temperature of the combustion chamber 105 of the direct-injection gasoline engine 1 mounted on the hybrid vehicle, the internal combustion engine whose combustion chamber temperature the temperature acquisition apparatus acquires may be of any other type. For example, the temperature acquisition apparatus may acquire the temperature of the combustion chamber of a diesel engine or rotary engine.

While, in the above embodiment, the temperature acquisition apparatus acquires the temperature Tp of the piston crown surface 103a of the piston 103 as the in-cylinder temperature, the component forming the combustion chamber of the internal combustion engine is not limited to that described above. For example, the temperature acquisition apparatus may acquire the temperature of the cylinder surface of a reciprocating engine or the rotor surface of a rotary engine.

While, in the above embodiment, the cumulative intake air amount $\Sigma G$ is used as the workload of the engine 1, the workload of the internal combustion engine is not limited to that described above. For example, the amount of fuel injection may be used as the workload of the internal combustion engine.

While, in the above embodiment, the single predetermined temperature Tp0 is set by noting soot emission and the temperature range determination unit determines whether the engine 1 is in a low in-cylinder temperature state less than the predetermined temperature Tp0 or a high in-cylinder temperature state equal to or higher than the predetermined temperature Tp0, the temperature range determination unit need not make such a determination. Specifically, multiple temperature threshold values may be set in accordance with the number of states noted to control the internal combustion engine so that the temperature range determination unit determines which of three or more temperature ranges the in-cylinder temperature falls within.

While, in the above embodiment, the intake air amount acquisition unit or cumulative amount calculation unit detects the intake air amount G on the basis of signals from the intake air amount sensor 34 and calculates the cumulative intake air amount $\Sigma G$, the intake air amount acquisition unit or cumulative amount calculation unit may be configured otherwise. For example, the intake air amount acquisition unit or cumulative amount calculation unit may acquire the intake air amount on the basis of a control command value with respect to the throttle valve and calculate the cumulative intake air amount.

While, in the above embodiment, the threshold value $\Sigma G0$ of the cumulative intake air amount $\Sigma G$ is set by noting soot emission (FIG. 8), the threshold setting unit may set any other type of threshold value as long as it sets a boundary value corresponding to a state noted to control the internal combustion engine.

While, in the above embodiment, the threshold value $\Sigma G0$ is set in accordance with the cooling water temperature Tw detected by the water temperature sensor 33, the temperature sensor may be configured otherwise as long as the temperature used to set the threshold value represents the temperature of the internal combustion engine. For example, an oil temperature sensor that detects the temperature of engine lubrication oil may be used as a temperature sensor.

In the above embodiment, it is determined whether warm-up of the catalyst device 13 is complete, on the basis of whether the total workload of the engine 1 has reached the target total workload. However, if the vehicle is a vehicle not including a motor as a travel drive source, the target time for performing a warm-up operation in the catalyst warming mode M2 may be set in accordance with the cooling water temperature at the time of starting the engine so that it is determined that the warm-up operation is complete, upon a lapse of the target time.

While, in the above embodiment, the injection pattern in the adherence reduction mode M3 is determined in accordance with the map (FIG. 5) representing the relationship between the engine speed Ne and the target amount of injection Q determined in accordance with the intake air amount G detected by the intake air amount sensor 34, and the injection pattern in the homogeneity improvement mode M4 is determined in accordance with the map (FIG. 4) representing the relationship between the engine speed Ne and the intake air amount G detected by the intake air amount sensor 34. That is, the engine output torque is detected on the basis of signals from the intake air amount sensor 34. However, the engine output torque may be detected on the basis of a physical quantity having a correlation with the engine output torque.

While, in the above embodiment, the maximum injection frequency in the adherence reduction mode M3 is set to four times and the maximum injection frequency in the homogeneity improvement mode M4 is set to twice, the maximum injection frequency are not limited to those described above as long as the maximum injection frequency in the adherence reduction mode M3 is higher than the maximum injection frequency in the homogeneity improvement mode M4. For example, the maximum injection frequency in the homogeneity improvement mode M4 may be three times.

While, in the above embodiment, the fuel is injected in the first half of the intake stroke and the second half of the compression stroke in the knock suppression mode M5, the injection mode may be configured otherwise as long as the fuel is injected in a manner different from the injection manner in the adherence reduction mode M3 and the homogeneity improvement mode M4 such that knocks are suppressed.

The above embodiment can be combined as desired with one or more of the above modifications. The modifications can also be combined with one another.

According to the present invention, it is possible to acquire the temperature of the combustion chamber considering the surface temperature of the constituent member.

Above, while the present invention has been described with reference to the preferred embodiments thereof, it will be understood, by those skilled in the art, that various changes and modifications may be made thereto without departing from the scope of the appended claims.

What is claimed is:

1. A temperature acquisition apparatus for an internal combustion engine, configured to acquire a temperature of a combustion chamber of the internal combustion engine, comprising:
a temperature sensor configured to detect a water temperature of cooling water for cooling the internal combustion engine or an oil temperature of lubrication oil for lubricating the internal combustion engine; and an electronic control unit having a processor and a memory coupled to the processor, wherein the processor is configured to perform:
acquiring an intake air amount of the internal combustion engine;
calculating a cumulative intake air amount based on the intake air amount;
acquiring a temperature of the internal combustion engine based on the cumulative intake air amount; and
setting a threshold value of the cumulative intake air amount so that the threshold value becomes smaller as the water temperature or the oil temperature is higher based on the water temperature or the oil temperature detected by the temperature sensor, wherein the processor is configured to perform:
the temperature acquiring including:
determining whether the cumulative intake air amount is equal to or larger than the threshold value; and
determining that the internal combustion engine is in a high temperature state when it is determined that the cumulative intake air amount is equal to or larger than the threshold value.

2. The apparatus according to claim 1, wherein
the processor is configured to perform:
the temperature acquiring including acquiring the temperature of the internal combustion engine by determining whether the internal combustion engine is in the high temperature state in which a surface of a constituent member constituting the combustion chamber is a predetermined temperature or higher based on the cumulative intake air amount.

3. The apparatus according to claim 1, wherein
the processor is configured to further perform:
acquiring an ignition timing of the internal combustion engine, wherein
the processor is configured to perform:
the cumulative intake air amount calculating including correcting the cumulative intake air amount so that an increment of the cumulative intake air amount becomes smaller as the ignition timing is retarded from an optimum ignition timing based on the ignition timing.

4. The apparatus according to claim 1, wherein
the processor is configured to further perform:
determining an operation state of the internal combustion engine from among a plurality of operation states including a first operation state in which the internal combustion engine performs air intake and fuel injection and a second operation state in which the internal combustion engine performs only air intake, wherein
the processor is configured to perform:
the cumulative intake air amount calculating including clearing the cumulative intake air amount when the operation state of the internal combustion engine is changed from the first operation state to the second operation state based on a determination result of the operation state.

5. The apparatus according to claim 4, wherein
the processor is configured to perform:
the threshold value setting including resetting the threshold value so that the threshold value becomes larger as the cumulative intake air amount calculated during when the operation state of the internal combustion engine is the second operation state is larger, when the operation state of the internal combustion engine is changed from the second operation state to the first operation state based on the determination result of the operation state.

6. The apparatus according to claim 4, wherein
the plurality of operation states further includes: a third operation state in which the internal combustion engine starts from a cold state, wherein
the processor is configured to perform:
the threshold value setting including:
setting the threshold value to a first predetermined value when it is determined that the operation state of the internal combustion engine is the third operation state; and then
setting the threshold value to a second predetermined value smaller than the first predetermined value when it is determined that the internal combustion engine is in the high temperature state.

7. The apparatus according to claim 6, wherein
the plurality of operation states further includes: a fourth operation state in which the internal combustion engine stops both air intake and fuel injection, wherein
the processor is configured to perform:
the temperature acquiring including:
determining whether the cumulative intake air amount calculated after the operation state of the internal combustion engine is changed to the second operation state is equal to or larger than a predetermined value, when it is determined that the operation state of the internal combustion engine is the second operation state;
determining that the internal combustion engine is in a low temperature state when it is determined that the cumulative intake air amount calculated after the operation state of the internal combustion engine is changed to the second operation state is equal to or larger than the predetermined value;
determining whether an elapsed time period after the operation state of the internal combustion engine is changed to the fourth operation state is equal to or longer than a predetermined time period, when it is determined that the operation state of the internal combustion engine is the fourth operation state; and
determining that the internal combustion engine is in the low temperature state when it is determined that the elapsed time period after the operation state of the internal combustion engine is changed to the fourth operation state is equal to or longer than the predetermined time period, wherein
the processor is configured to perform:
the threshold value setting including setting the second predetermined value based on the cumulative intake air amount calculated after the operation state of the internal combustion engine is changed to the second operation state, or the elapsed time period after the operation state of the internal combustion engine is changed to the fourth operation state.

8. A temperature acquisition apparatus for an internal combustion engine, configured to acquire a temperature of a combustion chamber of the internal combustion engine, comprising:
a temperature sensor configured to detect a water temperature of cooling water for cooling the internal combustion engine or an oil temperature of lubrication oil for lubricating the internal combustion engine, and an electronic control unit having a processor and a memory coupled to the processor, wherein
the processor is configured to function as:
an intake air amount acquisition unit configured to acquire an intake air amount of the internal combustion engine;
a cumulative amount calculation unit configured to calculate a cumulative intake air amount based on the intake air amount;
a temperature acquisition unit configured to acquire a temperature of the internal combustion engine based on the cumulative intake air amount; and
a threshold setting unit configured to set a threshold value of the cumulative intake air amount so that the threshold value becomes smaller as the water temperature or the oil temperature is higher based on the water temperature or the oil temperature detected by the temperature sensor, wherein
the temperature acquisition unit determines whether the cumulative intake air amount is equal to or larger than the threshold value, and determines that the internal combustion engine is in a high temperature state when it is determined that the cumulative intake air amount is equal to or larger than the threshold value.

9. The apparatus according to claim 8, wherein
the temperature acquisition unit acquires the temperature of the internal combustion engine by determining whether the internal combustion engine is in the high temperature state in which a surface of a constituent member constituting the combustion chamber is a predetermined temperature or higher based on the cumulative intake air amount.

10. The apparatus according to claim 8, wherein
the processor is configured to further function as:
an information acquisition unit configured to acquire an ignition timing of the internal combustion engine, wherein
the cumulative intake air amount calculation unit corrects the cumulative intake air amount so that an increment of the cumulative intake air amount becomes smaller as the ignition timing is retarded from an optimum ignition timing based on the ignition timing.

11. The apparatus according to claim 8, wherein
the processor is configured to further function as:
an operation state determination unit configured to determine an operation state of the internal combustion engine from among a plurality of operation states including a first operation state in which the internal combustion engine performs air intake and fuel injection and a second operation state in which the internal combustion engine performs only air intake, wherein
the cumulative intake air amount calculation unit clears the cumulative intake air amount when the operation state of the internal combustion engine is changed from the first operation state to the second operation state based on a determination result of the operation state.

12. The apparatus according to claim 11, wherein
the threshold setting unit resets the threshold value so that the threshold value becomes larger as the cumulative intake air amount calculated during when the operation state of the internal combustion engine is the second operation state is larger, when the operation state of the internal combustion engine is changed from the second operation state to the first operation state based on the determination result of the operation state.

13. The apparatus according to claim 11, wherein
the plurality of operation states further includes: a third operation state in which the internal combustion engine starts from a cold state, wherein
the threshold setting unit sets the threshold value to a first predetermined value when it is determined that the operation state of the internal combustion engine is the third operation state, and then sets the threshold value to a second predetermined value smaller than the first predetermined value when it is determined that the internal combustion engine is in the high temperature state.

14. The apparatus according to claim 13, wherein
the plurality of operation states further includes: a fourth operation state in which the internal combustion engine stops both air intake and fuel injection, wherein
the temperature acquisition unit determines whether the cumulative intake air amount calculated after the operation state of the internal combustion engine is changed to the second operation state is equal to or larger than a predetermined value, when it is determined that the operation state of the internal combustion engine is the second operation state; determines that the internal combustion engine is in a low temperature state when it is determined that the cumulative intake air amount calculated after the operation state of the internal combustion engine is changed to the second operation state is equal to or larger than the predetermined value; determines whether an elapsed time period after the operation state of the internal combustion engine is changed to the fourth operation state is equal to or longer than a predetermined time period, when it is determined that the operation state of the internal combustion engine is the fourth operation state; and determines that the internal combustion engine is in the low temperature state when it is determined that the elapsed time period after the operation state of the internal combustion engine is changed to the fourth operation state is equal to or longer than the predetermined time period, wherein
the threshold setting unit sets the second predetermined value based on the cumulative intake air amount calculated after the operation state of the internal combustion engine is changed to the second operation state, or the elapsed time period after the operation state of the internal combustion engine is changed to the fourth operation state.

* * * * *